(12) United States Patent
Warfield et al.

(10) Patent No.: US 10,268,390 B2
(45) Date of Patent: Apr. 23, 2019

(54) METHODS, SYSTEMS AND DEVICES RELATING TO DATA STORAGE INTERFACES FOR MANAGING DATA ADDRESS SPACES IN DATA STORAGE DEVICES

(71) Applicant: OPEN INVENTION NETWORK LLC, Durham, NC (US)

(72) Inventors: Andrew Warfield, Vancouver (CA); Timothy John Deegan, Cambridge (GB); Keir Fraser, Cambridge (GB); Daniel Stodden, Vancouver (CA); Kevin Jamieson, Vancouver (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

(21) Appl. No.: 15/484,252

(22) Filed: Apr. 11, 2017

(65) Prior Publication Data

US 2017/0220254 A1   Aug. 3, 2017

Related U.S. Application Data

(63) Continuation of application No. 14/614,930, filed on Feb. 5, 2015, now Pat. No. 9,619,155.
(Continued)

(51) Int. Cl.
*G06F 3/06* (2006.01)

(52) U.S. Cl.
CPC .............. *G06F 3/061* (2013.01); *G06F 3/064* (2013.01); *G06F 3/065* (2013.01); *G06F 3/0611* (2013.01);
(Continued)

(58) Field of Classification Search
CPC ...... G06F 3/064; G06F 3/0611; G06F 3/0643; G06F 3/0661; G06F 3/0676; G06F 3/0619; G06F 3/0688; G06F 3/061; G06F 3/0655
(Continued)

(56) References Cited

U.S. PATENT DOCUMENTS

| 6,772,203 B1 | 8/2004 | Feiertag et al. |
| 7,206,805 B1 | 4/2007 | McLaughlin, Jr. |

(Continued)

FOREIGN PATENT DOCUMENTS

| JP | 2009238234 A2 | 10/2009 |
| JP | 2012185851 A2 | 9/2012 |

(Continued)

*Primary Examiner* — Hashem Farrokh

(57) ABSTRACT

Data address management systems, methods, devices and uses for minimizing interaction with data consumers' data on data storage devices, an embodiment comprising an external bus for communicatively interfacing the data storage system and data consumers; at least one storage medium components, each storage medium component comprising a plurality of storage locations having a unique storage location indicators; a translation layer module comprising a data address space having data addresses associable with storage location indicators; and a controller configured to store data in the storage locations and creating associations in the translation layer module between data addresses and the physical location indicators; wherein the data address space is accessible by the data consumer for addressing requests relating to data stored on the storage device and wherein the controller is configured to manipulate the arrangement of the data addresses in the data address space.

22 Claims, 6 Drawing Sheets

Related U.S. Application Data

(60) Provisional application No. 61/938,348, filed on Feb. 11, 2014, provisional application No. 61/937,020, filed on Feb. 7, 2014.

(52) U.S. Cl.
CPC .......... *G06F 3/0619* (2013.01); *G06F 3/0643* (2013.01); *G06F 3/0655* (2013.01); *G06F 3/0661* (2013.01); *G06F 3/0676* (2013.01); *G06F 3/0688* (2013.01)

(58) Field of Classification Search
USPC ........................................................ 711/103
See application file for complete search history.

(56) References Cited

U.S. PATENT DOCUMENTS

| | | | |
|---|---|---|---|
| 8,160,070 | B2 | 4/2012 | Dai et al. |
| 8,397,016 | B2 | 3/2013 | Talagala et al. |
| 8,442,059 | B1 | 5/2013 | de la Iglesia et al. |
| 8,627,467 | B2 | 1/2014 | Levy et al. |
| 8,726,064 | B2 | 5/2014 | Bennett |
| 8,830,836 | B1 | 9/2014 | Park et al. |
| 8,861,213 | B2 | 10/2014 | Sisler |
| 8,949,502 | B2 | 2/2015 | McKnight et al. |
| 2002/0159760 | A1* | 10/2002 | Karasudani .......... G11B 27/036 386/283 |
| 2003/0110263 | A1 | 6/2003 | Shillo |
| 2007/0033327 | A1* | 2/2007 | Sinclair ................ G06F 3/0605 711/103 |
| 2009/0020608 | A1 | 1/2009 | Bennett et al. |
| 2009/0070612 | A1 | 3/2009 | Adelman et al. |
| 2009/0216924 | A1 | 8/2009 | Bennett |
| 2009/0300605 | A1 | 12/2009 | Edwards et al. |
| 2010/0037009 | A1 | 2/2010 | Yano et al. |
| 2010/0070978 | A1 | 3/2010 | Chawla et al. |
| 2010/0107160 | A1 | 4/2010 | Srinivasan |
| 2010/0293334 | A1* | 11/2010 | Xun ................. G06F 17/30949 711/129 |
| 2010/0317377 | A1* | 12/2010 | Zou ........................ G06Q 10/02 455/466 |
| 2011/0179413 | A1 | 7/2011 | Subramanian et al. |
| 2011/0213908 | A1 | 9/2011 | Bennett |
| 2011/0219206 | A1* | 9/2011 | Tan ........................ G06F 12/10 711/209 |
| 2011/0239213 | A1 | 9/2011 | Aswani et al. |
| 2012/0011500 | A1 | 1/2012 | Faraboschi et al. |
| 2012/0063749 | A1* | 3/2012 | Kamijima ........ H04N 21/85406 386/328 |
| 2012/0304171 | A1 | 11/2012 | Joshi et al. |
| 2012/0317377 | A1* | 12/2012 | Palay .................. G06F 12/0246 711/154 |
| 2013/0007735 | A1 | 1/2013 | Bookman et al. |
| 2013/0042119 | A1 | 2/2013 | Bennett |
| 2013/0185508 | A1* | 7/2013 | Talagala .............. G06F 12/0871 711/118 |
| 2013/0262752 | A1 | 10/2013 | Talagala et al. |
| 2013/0282980 | A1 | 10/2013 | Bennett |
| 2013/0290611 | A1 | 10/2013 | Biederman et al. |
| 2013/0318285 | A1 | 11/2013 | Pignatelli |
| 2014/0003001 | A1 | 1/2014 | Sisler |
| 2014/0063752 | A1 | 3/2014 | Sisler et al. |
| 2014/0089567 | A1 | 3/2014 | Pignatelli |
| 2014/0189210 | A1* | 7/2014 | Sinclair ............... G06F 12/0246 711/103 |
| 2014/0189211 | A1* | 7/2014 | George ................. G06F 3/0613 711/103 |
| 2014/0215125 | A1* | 7/2014 | Sela .................. G06F 12/0246 711/103 |
| 2014/0372686 | A1 | 12/2014 | Maheshwari et al. |
| 2015/0074327 | A1* | 3/2015 | Xu ...................... G06F 12/0246 711/103 |
| 2015/0186279 | A1* | 7/2015 | Dong .................. G06F 12/0833 711/135 |

FOREIGN PATENT DOCUMENTS

| | | |
|---|---|---|
| JP | 2013168164 A2 | 8/2013 |
| JP | 2013191217 A2 | 9/2013 |

* cited by examiner

METHODS, SYSTEMS AND DEVICES RELATING TO DATA STORAGE INTERFACES FOR MANAGING DATA ADDRESS SPACES IN DATA STORAGE DEVICES

CROSS-REFERENCE TO RELATED APPLICATIONS

This application is a continuation of U.S. patent application Ser. No. 14/614,930 filed Feb. 5, 2015, now U.S. Pat. No. 9,619,155, which claims the benefit of U.S. Provisional Application No. 61/93,348 filed Feb. 11, 2014, and U.S. Provisional Application No. 61/937,020 filed Feb. 7, 2014. The disclosures of the above mentioned applications are hereby incorporated herein by reference in their entirety.

FIELD OF THE DISCLOSURE

The present disclosure relates to data storage systems and devices, and in particular, to methods, systems and devices relating to data storage interfaces for managing data address spaces in data storage devices.

BACKGROUND

Storage devices, in general, have various methodologies for placing and allocating data onto the designated locations of the applicable storage medium, depending generally on the type of storage medium. As such, most storage media have an "address space" that may be used to associate a physical "storage space" on that media and which address space is presented to consumers of the data storage as the available storage. Depending on the storage media, there may be unique challenges and utilizations for managing the address space for the different types of media.

For example, a typical flash memory device may in fact have 1.2 TB of physical storage, but only 800 MB of address space available for use by a data consumer; while described below in greater detail, this is to manage a unique property of flash memory associated with the requirement that prior to updating data in a memory cell that already has data therein, the data must first be deleted (not overwritten) and any deletion happens with reduced granularity than is possible by writes. In other words, a complete erase block (which will be denoted as a "row" of memory cells in some examples) must be first deleted to write new data to any currently occupied/in-use memory cell in that erase block. When such data to be deleted or updated co-exists in an erase block with live data (which therefore cannot be erased), flash devices are presented with a problem which they have evolved in various ways to address.

In flash devices, a data address space is used to manage this flash-specific issue, particularly in cases when (1) other memory cells within an erase block have data that must be maintained and (2) an increased number of the available rows of memory have at least one cell with live data. In such cases, data must be reallocated to ensure that there remain available rows of memory cells which can be entirely deleted if necessary. The address space is configured to provide a data address for data stored in memory blocks that are originally associated with memory blocks in a row (i.e. erase block), such row also containing other live and possibly non-related data, with memory blocks in other rows that do not suffer the same limitation (meaning that data can be written thereto without deleting the entire row or that the remaining memory blocks in the row can be deleted without destroying other live data). In order to avoid the scenario in which there are no more rows that can be safely deleted, because all or nearly all rows contain at least one block with live data, the flash device may be configured to consistently re-associate the data in the data address space to preserve available rows; in some cases, the flash device is overprovisioned with memory relative to the address space; in some cases, the flash device is also overprovisioned with processing capability, for example with a dedicated high-speed processor to manage the allocation of the data; in some cases, all or a combination of some of these are implemented.

While the above issue relates to flash memory devices, similar translation layers may exist in other forms of data storage devices in which the physical locations, or addresses or other indicators of the actual location of storage locations within the storage media, may be abstracted by virtual addresses (which may be referred to herein as data addresses). For example, in spinning disk devices, the physical data locations are frequently defragmented or collocated within the same track on a disk, or moved to an outer track (upon which data retrieval may be faster), since data located in close proximity speeds performance in spinning disk media. In order to keep track of the data, a translation layer, such as a register that maintains a log or table keeping track of data addresses and physical location indicators is maintained. The data addresses exist in a data address space and, from the perspective of the physical storage media, are not currently managed in order to impact performance of the device.

From the perspective of the data consumer at any layer or abstraction (like for example, a user, a file system, or the forwarding tables on a network switch), all of this translation, and the underlying physical locations are not visible; the data consumer views the storage device as having a capacity that is equal in size to that of the data address space, and in fact may in cases be indistinguishable from such data address space. From the perspective of a data consumer, a flash device, for example, is a storage resource with a capacity that is the same as the address space.

Flash memory is becoming a widely used storage media due to its improved performance in some respects: fast access speeds, low-power, non-volatile, and rugged operation. Most flash devices comprise a flash translation layer (FTL) that generally comprises an FTL driver that works in conjunction with an existing operating system (or, in some embedded applications, as the operating system) to make linear flash memory, with erase blocks that are larger than individual write blocks, appear to the system like a single memory resource. It does that by doing a number of things. First, it creates "virtual" small blocks of data, or sectors, out of the flash's large erase blocks. Next, it manages data on the flash so that it appears to be "write in place" when in fact it is being stored in different spots in the flash. Finally, FTL manages the flash so there are clean/erased places to store data.

File systems, or other data consumers, such as, for example, operating systems on data consuming devices, such as DOS, typically use drivers that perform input and output in structured pieces called blocks. Block devices may include all disk drives and other mass-storage devices on the computer. FTL emulates a block device. The flash media appears as a contiguous array of storage blocks numbered from zero to one less than the total number of blocks. In the example of DOS interacting with a flash memory device, FTL acts as a translation layer between the native DOS BPB/FAT file system and flash. FTL remaps the data to the physical location at which the data is to be written. This allows the DOS file system to treat flash like any other block storage device and remains ignorant of flash device characteristics. FTL appears to simply take the data from the file system and write it at the specified location (sector). In reality, FTL places the data at a free or erased location on the flash media and notes the real location of the data. It may in some cases also invalidate the block that previously contained the block's data (if any), either in the FTL or in a separate data tracking module elsewhere on, or in data communication with, the FTL or the computing processor resources that is running the FTL. If the file system asks for previously written data, it requests the data at the specified data address and the FTL finds and reads back the proper data from the actual physical storage location. Flash media allows only two states: erased and non-erased. In the erase state, a byte may be either all ones (0xFF) or all zeroes (0x00) depending on the flash device. A given bit of data may only be written when the media is in an erase state. After it is written to, the bit is considered dirty and unusable. In order to return the bit to its erase state, a significantly larger block of flash called an Erase Zone (also known as an erase block) must be erased. Flash technology does not allow the toggling of individual bits or bytes from a non-erased state back to an erased state. FTL shields the file system from these details and remaps the data passed to it by writing to unused data areas in the flash media. This presents the illusion to DOS, or other data consumer, that a data block is simply overwritten when it is modified. In fact, the amended data has been written somewhere else on the media. FTL may, in some cases, also take care of reclaiming the discarded data blocks for reuse. Although there are many types and manufacturers of flash memory, the most common type is known as NOR flash. NOR flash, such as that available from Intel Corporation™, operates in the following fashion: Erased state is 1, programmed state is 0, a 0 cannot be changed back to a 1 except by an erase, and an erase must occur on a full erase block. For additional detail, the following document may be referenced: "Understanding the Flash Translation Layer (FTL) Specification", Intel, 1998, and is incorporated herein fully by reference.

The emergence of commodity PCIe flash marks a remarkable shift in storage hardware, introducing a three-order-of-magnitude performance improvement over traditional mechanical disks in a single release cycle. PCIe flash provides a thousand times more random IOPS than mechanical disks (and 100 times more than SAS/SATA SSDs) at a fraction of the per-IOP cost and power consumption. However, its high per-capacity cost makes it unsuitable as a drop-in replacement for mechanical disks in all cases. As such, systems that have either or both the high performance of flash with the cheap capacity of magnetic disks in order to optimize these balancing concerns may become desired. In such systems, the question of how to arrange data across both such media, but also within such media is helpful in optimizing the requirements for wide sets of data. For example, in the time that a single request can be served from disk, thousands of requests can be served from flash. Worse still, IO dependencies on requests served from disk could potentially stall deep request pipelines, significantly impacting overall performance.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for methods, systems and devices relating to memory storage interfaces for managing data address spaces in data storage devices that overcome some of the drawbacks of known techniques, or at least, provide a useful alternative thereto. Some aspects of this disclosure provide examples of such methods, systems and devices. Some aspects further provide systems, methods and devices for amending data addresses within a data address space to arrange data addresses according to shared characteristics between underlying data and underlying data of adjacent or near-adjacent data addresses.

In accordance with one aspect, there is provided a data address management system on a data storage device for storing data from a data consumer, the data storage system comprising: an external bus for communicatively interfacing the data storage system and one or more data consumers; at least one storage medium component, each storage medium component comprising a plurality of storage locations, each storage location having a unique storage location indicator; one or more translation layer modules each comprising a data address space having a plurality of data addresses, each data address being associable with at least one storage location indicator; and one or more controllers each configured to carry out computer readable instructions for writing and reading data in the storage locations and amending associations in the one or more translation layer modules between data addresses and the storage location indicators; wherein the data address space is accessible by the data consumer via the external bus for addressing data requests to the one or more storage medium components and wherein at least one of the controllers is configured to manipulate the arrangement of data addresses in the data address space by changing the associations between data addresses and storage location indicators.

In accordance with another aspect, there is provided a method for manipulating a data address space of a data storage device, the data storage device comprising at least one controller and at least one storage medium component, the data address space comprising a plurality of data addresses, each data address being associable with at least one storage location indicator that is indicative of a storage location in the at least one storage medium component, the method comprising the following steps: selecting a first data address in the data address space associated with a first data via a first storage location indicator, wherein the first data lacks a pre-determined storage-related characteristic with data associated with at least one data address that is locationally-related to the first data address; selecting a second data address from the data address space, the second data address being available for addressing data and being locationally-related to at least one data address that is associated with a second data that shares the pre-determined storage characteristic with the first data; and generating an association between the second data address and the storage location indicator indicating the current storage location of the first data.

In accordance with another aspect, there is provided a use of a data address management system for minimizing interaction with the data storage device by the data consumer by manipulating the data address space to arrange data addresses in the data address space in accordance with at least one operational objective; the data storage system on a data storage device for storing data from a data consumer, the data storage system comprising: an external bus for communicatively interfacing the data storage system and one or more data consumers; at least one storage medium component, each storage medium component comprising a plurality of storage locations, each storage location having a unique storage location indicator; one or more translation layer modules each comprising a data address space having a plurality of data addresses, each data address being associable with at least one storage location indicator; and one or more controllers each configured to carry out computer readable instructions for writing and reading data in the storage locations and amending associations in the one or more translation layer modules between data addresses and the storage location indicators; wherein the data address space is accessible by the data consumer via the external bus for addressing data requests to the one or more storage medium components and wherein at least one of the controllers is configured to manipulate the arrangement of data addresses in the data address space by changing the associations between data addresses and storage location indicators.

In accordance with another aspect, there is provided a data storage device interface between a data consumer and a data storage device, the data storage device comprising (i) at least one storage medium component with storage locations and (ii) a data address space comprising a plurality of data addresses, the data storage device interface comprising: a functionality command for providing a data address reallocation mode for manipulating data addresses in the data address space; a source data address identifier that identifies a first data address for reallocation, the first data address in use for addressing a first data and being associated with a first storage location indicator indicative of the storage location storing the first data; and a destination data address identifier that identifies a second data address, the second data address being available for addressing the data; wherein the functionality command instructs the data storage device to allocate the first storage location indicator to the destination data address.

In some aspects, the operational objectives may include any combination of the following: defragmenting data addresses within one or more data address space to minimize write requests required to write additional data objects to the data storage device; sequentializing data addresses within one or more data address spaces relating to data from a sequence-dependent data object to minimize read requests required for a single data object; grouping data addresses associated with temporally related data to minimize read requests for multiple temporally-related data objects; grouping data addresses associated with similar metadata from multiple related data objects to minimize requests relating to an assessment of at least one shared characteristic of the multiple related data objects; grouping locationally-related data addresses in the data address space when the data associated therewith via the storage location indicators are related metadata; as well as combinations thereof.

In some aspects, the rearrangement of data addresses in the data address space may be accomplished by moving or changing physical location indicators for data from a first data address to a second data address that is available for addressing data, wherein the second data address can is adjacent to or is otherwise locationally-related with in the data address space at least one other data address that can be associated with data that shares the first similarity or storage-related characteristic with the data in the first data address.

In accordance with another aspect, there is provided a data storage system for managing data storage from a data consumer, the data storage system comprising: a storage medium defining a plurality of storage locations, each one of which having a unique storage location indicator associated therewith; a translation layer defining a data address space having a plurality of data addresses, each one of which being assignable to at least one said unique storage location indicator; a resident controller carrying out computer readable instructions for writing and reading data in said storage locations and managing data addresses assigned thereto in said translation layer, said resident controller being further operable to carry out address space optimization instructions in reassigning at least some of said data addresses in said data address space to optimize access to said storage medium via said data address space; and an external communication interface accessible to the data consumer to service data requests received therefrom to said storage medium via said data address space.

In general, the subject matter of this disclosure relates to the management of the data address space of data storage devices using the infrastructure of such devices that have been developed to manage the physical storage locations of data on the specific storage media thereon in accordance with specific operational limitations resulting from the characteristics of such media. The subject matter disclosed herein for managing the data address space may have beneficial impact to either or both of the data consumer and the data storage device (e.g. certain kinds of memory degrade at given storage locations as a function of the number of storage operations that occur at those locations and so minimizing read, write, or erase requests or operations will extend the life of the storage device for the same utilization).

From the perspective of both the data consumer and the flash device, an efficiently managed address space can permit more efficient data transactions (with, for example, lower latency) and a reduced number of transactions to the physical storage cells of the flash (which will extend the life of the flash). Described are devices, systems, and methods for organizing the placement of data within an address space, particularly for storage devices, so as to minimize the number of operations required to interact with that data.

The data consumer, in general, interacts with the data address space and there may be advantages for managing the use of the data address space, as well as the physical data storage locations, via the internal. The instant disclosure leverages the inherent capabilities of many storage devices, which utilize a translation layer for other reasons, to manage and/or organize the data address space in a manner that improves interaction between the data consumer and the storage device. The management may also improve operational characteristics of the storage device, both in real-time or short-term operation, but also in long-term operation. By manipulating the address space, the number of operations required to interact with the data stored (or intended to be stored) on the storage device can be reduced/minimized, made faster, and/or otherwise improved. Among other benefits, fewer data operations during data requests reduces bandwidth and latency, improves communications between the data consumer and the data storage device (as well as the components and sub-components of the data storage device), and improves the lifetime of certain types of media (for example, the life time of flash may reduce over time or with increased usage).

Under load, what is frequently one of the larger performance pain points in enterprise data storage systems, is defragmenting the flash address space. Fragmentation is a general problem that will affect many applications of storage media devices, such as but not limited to PCIe flash. Defragmenting/compacting the Flash LBA using an FTL indirection table along with the appropriate functionality and interface to do this redirection from the host could provide performance enhancements in some cases for, as an example, sustained, mixed-write workloads.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
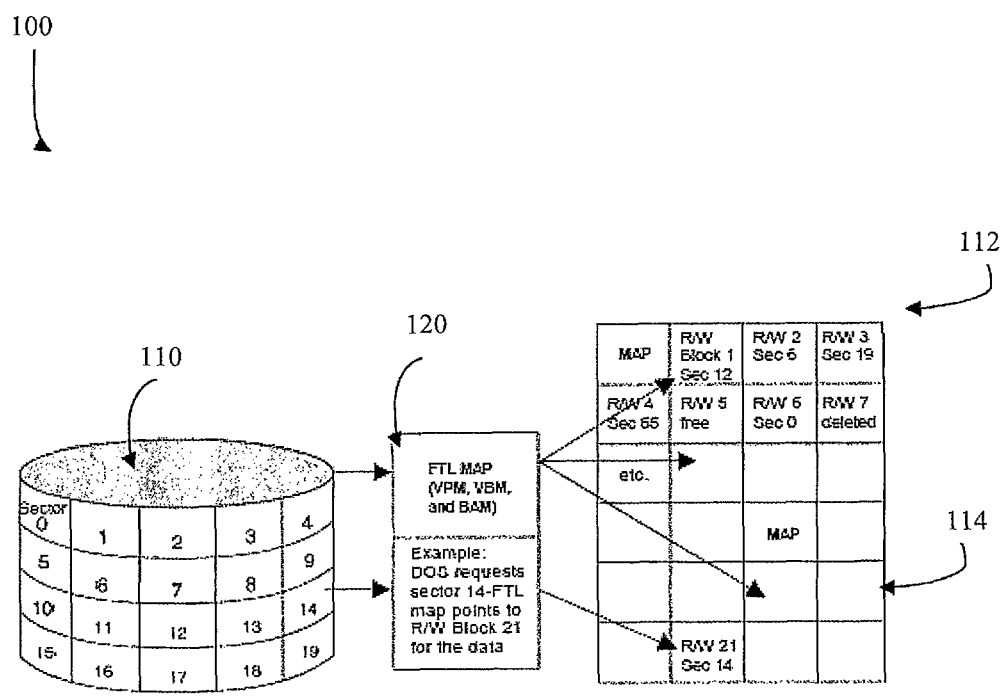
FIG. 1 is a diagrammatic representation of a data consumer, a translation layer, and the physical storage locations of a physical storage medium.

The present invention will now be described more fully with reference to the accompanying schematic and graphical representations in which representative embodiments of the present invention are shown. The invention may however be embodied and applied and used in different forms and should not be construed as being limited to the exemplary embodiments set forth herein. Rather, these embodiments are provided so that this application will be understood in illustration and brief explanation in order to convey the true scope of the invention to those skilled in the art.

In many modern storage devices, such as flash storage devices and disk drive storage devices, as well as, for example, the combination of RAM, MMU and a CPU in a general-purpose computer, there are provided various ways of managing the placement of data within the physical storage media of such devices. Such schemes may be implemented in order to place, move and/or manage the data within locations on the physical storage media to overcome data storage limitations associated with such devices, wherein visibility to the data consumer of such placement, movement, and/or management to overcome said limitations may be minimized. To implement such data management schemes, many such devices include dedicated and/or high-speed device-internal components and functionalities, such as processors, data buses, and memory for facilitating rapid placement, movement and management of the data. A translation layer is also often used to integrate data addresses, visible to a data consumer, and indicators of the location of the corresponding data on the physical storage medium, which are not visible to the data consumer. Such translation layers permit the device to move data storage locations on the physical data storage media without necessarily changing the data address of that data, which is used by a data consumer to transact with the data or applicable data storage (e.g. send read, write or update data requests). Subject matter disclosed herein exposes those functionalities and/or components to non-device data consumers (including, for example, users, other computers or computing devices, applications, and other APIs). This may facilitate, inter alia: (1) the ability to offload the overhead of data transfer between physical locations from data consumers directly onto the device-internal bus and transfer compute resources; and/or (2) the explicit manipulation of the translation layer (including the data address space) by off-device data consumers and/or (3) the use of data-specific characteristics to more optimally manage either or both of the data address space and storage location without the associated overhead of sending and receiving data requests between data consumer and device. By exposing certain controls of the device-internal components and the applicable translation layer, a data consumer can manipulate both the data address space and/or the locations of the physical data storage medium used for a given data set to, for example, optimize the use, operation, and useful life expectancy of the data storage device. These functionalities have heretofore been unavailable, or to the extent that they have been possible, require significant additional compute and network resources (i.e. a read data request, transmission of the requested data over the network in response to the read request, some degree of data storage and data processing at the requesting data consumer, a write request of the applicable data back over the network, and, in some cases, an acknowledgement of the write back to the data consumer). Myriad other advantages, many of which will become apparent from the subject matter disclosed herein, shall become apparent.

As an illustrative example of a device-specific storage limitation, the following example provides an overview of a limitation associated with a flash memory device (which may include any non-volatile memory device). Many modern flash devices utilize specific device-internal hardware and a flash translation layer to overcome an inherent storage limitation associated with flash data storage. In many modern flash memory systems, for example, flash memory media can only be written to memory units (e.g. a data block) if such units are in an erased state; such memory units in flash memory media, however, are generally only erasable in blocks of a plurality of such memory units. As such, a device-specific data storage management regime must be implemented in order to account for updating data stored in a subset of memory units in an erase block when other memory units in the same erase block cannot or should not be erased.

In general in most flash devices, if a data block needs to be updated or changed, it must first be erased; the granularity of a write block, however, is smaller than an erase block. As such, in order to update, change or over-write a given data block, all other data blocks that are a part of the same erase block must also first be erased, wherein an erase block consists of all data blocks in the flash memory media that are erased at the same time or as a result of the same erase command or set of erase commands. Other data blocks in the erase block may store unrelated data, which may not have to be updated (in fact, it is often both possible and likely that such data must not be changed in order to maintain reliable data storage). In order to account for this limitation, flash devices use a flash translation layer to associate data addresses, which may be used by data consumers to identify and locate data, with a location indicator representing the data block on the physical storage medium. When existing data is updated with new data, for example, but other data blocks in the erase block may not be erased, the flash device will write the new data to a further data block that is already in an erased state and the flash translation layer will be updated to now associate the data address with said further data block rather than the original data block that stores the pre-updated version of the data. The original data block, although not in an erased state and containing the older version of the data, will hold stale (or "dead") data and may be erased without losing current or live data (which may or may not be true for at least one other data block in the erase block). Since data in data blocks within the same erase block may be updated, changed or over-written in an arbitrary manner over time, at least with respect to one another, erase blocks can become sparsely populated with current data over time. The number of data addresses available in such devices are typically less than the actual number of available data blocks in order to account for this limitation (in many devices, the data storage medium is overprovisioned relative to the number of available data addresses). Moreover, the sparsely populated erase blocks must periodically be consolidated; otherwise, the device would reach capacity in an arbitrary manner, wherein some portion of the storage medium would in fact be available for storage as it holds dead data, which could be erased if the entire erase block could also be erased.

To mitigate this problem, the device periodically consolidates data blocks from a plurality of sparsely populated erase blocks into a smaller number of available erase blocks. Using the information in the flash translation layer, and the device-internal processor(s), data bus(es), and cache memory(ies), the sparse erase blocks are configured to periodically perform "garbage collection" by moving or copying data from data blocks from a plurality of sparsely populated erase blocks and consolidating such data blocks onto a smaller number of more densely used erase blocks so that one or more of the sparsely populated erase blocks from which the data was previously stored can be erased, thereby freeing up space for data storage. Flash devices must perform this type of garbage collection as the device approaches the maximum number of available erase blocks that have at least one non-erased data block, otherwise the flash device will not be able to accept further data for storage. Such garbage collection places significant strain on the processing capabilities of the device and data requests during such times may experience increased latency and/or reduced throughput, for example. Moreover, it results in assigning data addresses to data in an arbitrary manner. In general, with higher over-provisioning, this garbage collection needs to take place with reduced frequency, thereby reducing the processing strain but increasing the overall cost of the device. Similarly, with higher speed processing power, data buses, and memory (e.g. SDRAM), the garbage collection can occur more quickly and more frequently with less reduction on performance, which also means less over-provisioning is required but also with increased cost. The performance and cost of these solutions are generally balanced in various manners and may depend on, among other factors, the device, the manufacturer thereof, the data consumers that use or may use the device, and the intended use or objective of the device.

In another device type, spinning disk data storage devices, another device-specific storage limitation exists which utilizes similar device-internal processing components (processor, bus, memory) and a translation layer for managing data placement on the physical storage medium with little or no visibility to the data consumer. Portions of spinning disks are subject to failure; such failure may include the occurrence of bad sectors or regions on a disk, typically as the disk ages. To account for such occurrence, a translation layer and the device-internal components associate a different block, sector or portion of the disk that has not failed with the same data address in the translation layer as the failed block, sector or portion, and, if necessary, place a copy of the data into the new location. The data consumer accesses the data (or the associated data storage, if for example it is writing new data) according to same data address and has no visibility to the fact that there is a different location for storage on the physical storage medium. Over time, the data address space may become sparse and exhibit an arbitrary relationship to the corresponding locations on the physical storage medium or the data itself. As an exemplary result of this device-specific limitation, when related data, which may be read at same or similar times, is located in non-contiguous locations of a spinning disk, significant access times are introduced since the armature mechanism needs to move to appropriate location. Furthermore, as the data address becomes more sparse over time, fewer contiguous data addresses become available, and instead of associating an entire file, for example, with single contiguous set of data addresses (which would require a single or fewer number of data requests), a sparse data address space requires associating data from the same set of related data with a number of distinct data addresses, each of which requiring its own data request or set of data requests to access the data storage resource. This problem, which is applicable to flash devices and other devices, is exacerbated on a spinning disk when, for example, the armature mechanism must be displaced to access the arbitrarily located physical locations associated with the sparse data addresses. By exposing, as provided for herein, control over both the data address space management, as well as the location management of the physical storage media, the speed of the device in responding to data requests, there is increased efficiency of data requests, and the optimal placement of data within physical storage according to data characteristics.

In another example of a device-specific limitation, computing systems generally comprise a CPU, which processes an instruction stream. The CPU also generally comprises (although it may form a separate component accessible via a data bus or other communicative coupling) a memory management unit ("MMU"), which may provide similar or analogous functionalities as the translation layer. The MMU maintains a mapping between virtual addresses of data, which is visible to the CPU/instruction stream, and a location address corresponding to the physical location on the physical RAM. Both the location address management and the virtual address space in the MMU, and associations therebetween, are controlled and/or managed by the computing system operating system. As such, in some embodiments, RAM storage location management, as well as management of the virtual address space can be implemented according to the methods presented herein. That is, data address space management and physical location management, normally the domain of the OS and MMU, are exposed to the data consumer.

As a result of these problems, memory storage devices have developed both translation layer abstractions to internally manage the arrangement of physical storage locations on the storage media within a data storage device. In addition, internal overprovisioning of storage media relative to the size of the data address space, as well as higher-performing internal components (e.g. an internal bus on the data storage device that is faster, similar to a network switch forwarding plane, possibly owing to its dedicated functionality) that can be dedicated to the migration and rearrangement of data stored on the physical storage media have evolved to overcome device-specific storage limitations. Embodiments hereof utilize such device-internal components and translation layer to more optimally interact with and utilize said device.

As used herein, a "computing device" may include virtual or physical computing devices, and also refers to devices capable of receiving and/or storing and/or processing and/or providing computer readable instructions or information. Embodiments of the instantly disclosed subject matter may be implemented in a variety of different arrangements or combinations of computing devices and/or components thereof without departing from the scope and nature of the subject matter described herein; as described herein, reference to a single computing device may include a combination of multiple computing devices and/or components thereof in a connected and/or distributed manner.

As used herein, "memory" may refer to a resource or medium that is capable of having information stored thereon and/or retrieved therefrom. Memory, as used herein, can refer to different components, resources, media, or combinations thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Although the terms "data storage", "storage" and "memory" may sometimes carry different meaning, they may in some cases be used interchangeably herein.

As used herein, memory may comprise a single medium or unit, or it may be different types of resources that are combined logically or physically. This may include memory resources that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a disk drive, flash drive, optical drive, SSD, other flash-based memory, PCM (Phase change memory), or equivalent. A data storage medium or resource may include, in whole or in part, volatile memory devices, non-volatile memory devices, or both volatile and non-volatile memory devices acting in concert. Other forms of memory storage, irrespective of whether such memory technology was available at the time of filing, may be used without departing from the spirit or scope of the instant disclosure. For example, different high-throughput and low-latency storage media can be used in the same manner as PCIe Flash, including different solid-state memory technologies that will appear on the PCIe bus. Technologies including phase-change memory (PCM), spin-torque transfer (STT) and others that may develop can be used as memory storage media components. Some storage resources can be characterized as being high- or low-latency and/or high- or low-throughput and/or high- or low-capacity; in many embodiments, these characterizations are based on a relative comparison to other available storage resources on the same data server or within the same distributed storage system. For example, in a data server that comprises one or more PCIe Flash data storage components as well as one or more spinning disks, the PCIe flash will, relative to other storage resources, be considered as being lower latency and higher throughput, and the spinning disks will be considered as being higher latency and higher throughput. Higher or lower capacity depends on the specific capacity of each of the available storage resources, although in embodiments described herein, the form factor of a PCIe flash module is of lower capacity than a similarly sized form factor of a spinning disk. It may include a memory component, or an element or portion thereof, that is used or available to be used for information storage and retrieval.

A "computing processor component" refers in general to any component of a physical computing device that performs arithmetical, logical or input/output operations of the device or devices, and generally is the component of the computing device that carries out instructions. The computing processor component may process information for a computing device on which the computing processor component resides or for other computing devices that are communicatively coupled (both physical and virtual). It may also refer to one or a plurality of components that provide processing functionality of a computing processor component, and in the case of a virtual computing device, the computing processor component functionality may be distributed across multiple physical devices that are communicatively coupled. A computing processor component may alternatively be referred to herein as a CPU or a processor.

As used herein, "priority" of data generally refers to the relative "hotness" or "coldness" of data, as these terms would be understood by a person skilled in the art of the instant disclosure. The priority of data may refer herein to the degree to which data will be, or is likely to be, requested, written, or updated at the current or in an upcoming or given time interval. Priority may also refer to the speed at which data will be required to be either returned after a read request, or written/updated after a write/update request. In some cases, a high frequency of data transactions (i.e. read, write, or update) involving the data in a given time period, will indicate a higher priority. Alternatively, it may be used to describe any of the above states or combinations thereof. In some uses herein, as would be understood by a person skilled in the art, priority may be described as temperature or hotness. As is often used by a person skilled in the art, hot data is data of high priority and cold data is data of low priority. The use of the term "hot" may be used to describe data that is frequently used, likely to be frequently used, likely to be used soon, or must be returned, written, or updated, as applicable, with high speed; that is, the data has high priority. The term "cold" could be used to describe data that is infrequently used, unlikely to be frequently used, unlikely to be used soon, or need not be returned, written, updated, as applicable, with high speed; that is, the data has low priority. Priority may refer to the scheduled, likely, or predicted forward distance, as measured in time, between the current time and when the data will be called, updated, returned, written or used. Different data or data objects that have similar priority at similar times are temporally related.

As used herein, the term "data consumer" may refer to a computing device or software running thereon, virtual or physical, which generates or consumes data and/or data objects that are stored or intended to be stored on a data storage device. The data consumer is, in some embodiments, a logical or physical entity that is capable of, or configured for, making and/or sending data requests to the data storage device in respect of data stored thereon. Without limitation, but as illustrative examples, a data consumer may refer to a file system, a data client, an operating system, the computing device or computer program that runs such file systems, an application or an application-layer process, an operating system, a user thereof, or a combination of any of the foregoing. In some cases, web browsers may be considered to be data consumers that connect to, for example, web servers which retrieve web pages for display at the end user's computer; email clients retrieve email from mail servers, and as such may be considered to be a data consumer. Data consumers may communicate with data storage devices across physical networks which comprise the Internet, or they may reside on a single computing device or a group of communicatively connected computing devices. In accordance with the OSI model of computer networking, data consumers and data storage devices may be connected via a physical network of electrical, mechanical, and procedural interfaces that make up the transmission. They may utilize data link protocols to pass frames, or other data link protocol units, between fixed hardware addresses (e.g. MAC address) and utilize various protocols, including but not limited to Ethernet, Frame Relay, Point-to-Point Protocol. Data consumers and data storage devices may also communicate in accordance with packetized abstractions, such as the Internet Protocol (IPv4 or IPv6) or other network layer protocols, including but not limited to Internetwork Packet Exchange (IPX), Routing Information Protocol (RIP), and Datagram Delivery Protocol (DDP). End-to-end transport layer communication protocols may be utilized without departing from the scope of the instant disclosure (such protocols may include but not limited to the following: AppleTalk Transaction Protocol ("ATP"), Cyclic UDP ("CUDP"), Datagram Congestion Control Protocol ("DCCP"), Fibre Channel Protocol ("FCP"), IL Protocol ("IL"), Multipath TCP ("MTCP"), NetBIOS Frames protocol ("NBF"), NetBIOS over TCP/IP ("NBT"), Reliable Datagram Protocol ("RDP"), Reliable User Datagram Protocol ("RUDP"), Stream Control Transmission Protocol ("SCTP"), Sequenced Packet Exchange ("SPX"), Structured Stream Transport ("SST"), Transmission Control Protocol ("TCP"), User Datagram Protocol ("UDP"), UDP Lite, Micro Transport Protocol ("µTP"). Such transport layer communication protocols may be used to transport session, presentation- or application-level data. Other layer protocols and other types of data protocol units, as would be understood by a person skilled in the art and science of the subject matter disclosed herein, may be used for the communication of data requests and responses thereto between data consumers and data storage devices.

As used herein, a "data request" may refer to instructions or requests relating to the reading, writing, updating, and/or calling of data; and such data transactions may comprise of: (i) read requests and write requests that are issued by data consumers requesting an action be taken with specific data (e.g. read, write, update), (ii) responses to such read and write requests that are returned by data servers or data storage devices in response to a data request, and (iii) the read/write requests and their associated responses taken together. In some embodiments, data requests may originate at data consumers; in some embodiments, they may originate from applications running on or at a data consumer. In some embodiments, data requests are sent to data servers and then responded to appropriately, and a response is returned to the data client. In some embodiments, data requests may be asymmetrical in that a write request generally carries a relatively large amount of data from a data client to the distributed data storage system, since it must include the data to be written, and the data storage system returns a relatively much smaller response that acknowledges receipt and confirms that the data was written to memory and possibly information relating to the data address associated with the data; in some embodiments, a read request is a relatively small amount of data, whereas the response to the read request from the data storage system is the data that was read and is therefore much larger than the request, relatively speaking. Data requests are often made in accordance with an application or session layer abstraction; in some embodiments, they are instructions from one computing device (or other endpoint) to implement an action or a subroutine at another computing device. In some embodiments, data requests are sent over the network as NFS requests (application layer) contained within TCP segments (endpoint-to-endpoint data stream) which in turn are carried in IP packets over the Internet, across Ethernet-based devices within frames across networking devices. Other exemplary data requests may form RPC (Remote Procedure Call) requests, which may in turn comprise NFS requests or other types of data requests. Other examples include iSCSI, SMB, Fiber Channel, FAT, NTFS, RFS, as well as other file system requests and responses which would be known to persons skilled in the art of the instant disclosure. In some embodiments utilizing NFS, an NFS request and its corresponding response, would each be considered a data transaction.

In some embodiments, data consumers and data consumer applications communicate with data storage devices to access data resources in accordance with any of a number of application-level storage protocols, including but not limited to Network File System ("NFS"), Internet Small Computer System Interface ("iSCSI"), and Fiber Channel. Other storage protocols known to persons skilled in the art pertaining hereto may be used without departing from the scope of the instant disclosure. Additionally, object storage interfaces such as Amazon's S3, analytics-specific file systems such as Hadoop's HDFS, and NoSQL stores like Mongo, Cassandra, and Riak are also supported by embodiments herein.

In one embodiment of the subject matter disclosed herein there is provided a data address management system on a data storage device for storing data from a data consumer, the data storage system comprising: an external bus for communicatively interfacing the data storage system with one or more data consumers; at least one storage medium component, each storage medium component comprising a plurality of storage locations, each storage location having a unique storage location indicator; one or more translation layer modules each comprising a data address space having a plurality of data addresses, each data address being associable with at least one storage location indicator; and one or more controllers each configured to carry out computer readable instructions for writing and reading data in the storage locations and amending associations in the one or more translation layer modules between data addresses and the storage location indicators; wherein the data address space is accessible by the data consumer via the external bus for addressing data requests to the one or more storage medium components and wherein at least one of the controllers is configured to manipulate the arrangement of data addresses in the data address space by changing the associations between data addresses and storage location indicators.

In some embodiments, the data storage device is a device that is capable of interfacing with a data consumer and is, in whole or in part, used for storing data. It may refer to a flash memory device, such as Intel's PCIe flash product, a hard drive, or other types of data storage devices. In general, such devices will comprise of memory components, a processing component, and a translation resource. The external bus is, in general, a computing interface that permits data consumers to communicate with the data storage device.

The storage medium components generally comprise of the component of the data storage device where the data is physically stored. It may include, but is not limited to, the spinning magnetic disk and armature components (for reading and writing to the disks), flash memory component (e.g. NAND flash), or other types of storage media on which computer readable data can be stored. In general, specific locations on the storage medium components are capable or configured to store a discrete unit or portion of data, such locations are addressable by the storage device by having a storage location indicator associated therewith. For example, in FIG. 1, the storage medium 112 (in this case NAND flash) is divided into R/W blocks 114, each having a unique identifier that is used to identify that storage location when a request for data that is or is to be written/read/updated on that block is received by the data storage device from a data consumer 110.

The translation layer is a physical or logical resource that permits the storage device to generate a level of abstraction above the physical location indicators. Referring to FIG. 1, which shows a diagrammatic representation of a data consumer in communication with a storage device 100, the translation layer is the FTL (or Flash Translation Layer) 120, which is a table, log, or other form of register, that associates a set of virtualized data addresses to physical location indicators. Each data address is virtually assigned to a physical storage location by assigning to the data address in the translation layer the location indicator unique to that physical storage location. As such, each data address is a virtual or logical representation of an address to a physical storage location and is representative of a unit of storage that has the same capacity as the associated physical storage locations. As such, a data address space, which is the set of all available data addresses in the translation layer, is a virtualized representation of some or all of the storage capacity of the data storage device. In some embodiments, while the actual storage capacity in the storage medium components may be different from that logically presented by the translation layer, the storage capacity as represented by the data address space is the capacity that is made available by the data storage device. In one exemplary embodiment, which utilizes the hardware from an Intel™ PCIe flash device, the data address space represents 800 GB of storage, even though the flash storage media in the device in fact holds 1.2 Tb of data storage. In some cases, the data addresses that make up the data address space are a set of consecutive data addresses (which can be represented according to different addressing conventions). In other embodiments, not all the data addresses are consecutive; there may be distinct sub-groups of addresses that are consecutive; alternatively, there may be groups of related addresses for which single or a reduced number of data requests can efficiently interact with in order to access the data underlying the data addresses. In yet other embodiments, there may be a further level of abstraction above the translation layer, such as but not limited to data storage objects; such data storage objects may be presented by the data storage device as virtual or logical "containers" for data and will, in some embodiments, be considered as the data address space.

The controller may be a computing processor that is capable of carrying out instructions to implement actions within the data storage device. It may be configured to execute instructions for forwarding data, copying data, moving data, updating data, erasing erase blocks, and programming storage blocks in the storage medium component. It may be configured to carry out more complex series of instructions in response to commands and/or acquired or measured data. In general, it may consist of a CPU or other computer processing unit. In addition, the controller may be configured to manipulate or manage the data address space by changing associations within the translation layer, or it may cause the data storage device to move data from one data storage location to another and then cause the new location to be associated via its storage location indicator within the data address space such that the new data address meets one or more operational objectives, particularly with respect to those data addresses that are locationally-related (by virtue of being adjacent, nearly adjacent, sequential, or in predetermined or determinable locations).

The operational objectives may, in some embodiments, be related to organizing data addresses within the data address space in order to place multiple data addresses, which relate to data that share one or more similarities, in adjacent or nearly adjacent positions in the data address space. These similarities may in some embodiments relate to the data that is (or will be) stored at the physical location whose unique location indicator is associated with one or more of the multiple data addresses; this is intended to include the lack of data (or associated physical location indicator) or lack of live data, associated with a data address that may provide the similarity therebetween. In some embodiments, data addresses that are either (a) associated with location indicators that are erased, empty, or are eligible for being erased (because, for example, the data therein is no longer needed or current); or (b) not associated with any physical location indicators, are deemed to share a similarity and the controller may, in respect of certain operational objectives, arrange these data addresses together as much as possible within the data address space. When writing data from large data objects, the number of write requests will be reduced if there is a single or a small number of contiguous data addresses available for that data. In some cases, the similarity may be that the end of the data associated with a first data address is the beginning of the data of another piece of data that is associated with a second address (in this case, the two pieces of data may be sequential in a data stream or as they exist in a data object. For example, a video or audio file that is read sequentially will require fewer reads, and less work by the network elements and/or data consumer, if the data is available to be read in sequential data addresses. A single or reduced number of read requests can be used since an entire in-order sequence of data can be retrieved by memory; in such a case, the number of data requests is limited only by the size of the data requests, rather than the number of discrete groups of data addresses that are associated within the translation layer within that object. For data objects or data streams that are not sequence-dependent, mere contiguousness of the associated data addresses are sufficient. In some cases, the similarity will be that the underlying data associated with the multiple data addresses is that the data constitutes metadata, or is capable of being used to calculate or assess metadata or other such data; instead of writing a copy of such data to a specific and separate file, which is what is generally done in the art, the data addresses associated with the metadata can be grouped, thereby permitting for efficient data access to that data (with a minimized number of interactions) without generating additional copies (which consumes capacity and may become out-of-date quickly). Other similarities may include a temporal relationship; for data objects that tend to be associated with data requests made or communicated at or close to the same time, grouping such data according to their data addresses in the data address space can provide a form of tiering that, for example, can permit for pre-fetching data from temporally related data objects such that reading or writing such data can be accomplished in a reduced number of data requests.

In some embodiments, data addresses are associated with data from data objects because the data is written at a location that is associated via a physical location indicator with that data address. In other cases, the data address has been associated with a physical location because the physical location has been designated or has been made available for such data to be written. As such, data addresses may be associated with data that is to be part of a write request, even if the data has not been stored in the data storage device described herein.

In some embodiments, the disclosed subject matter relates to interfaces to the data storage device by the data consumer, which cause moving and copying data to a new physical location, which creates a new physical location indicator that can be associated with any data address in the data address space. It may also comprise copying or moving just the physical location indicator to another address space. In some cases, the data consumer must be notified that the data address associated with the data has been changed so that future data requests that relate to that data are kept up to date by the data consumer.

In some embodiments, the data address space may comprise a virtualization of data storage that appears to a data consumer as single storage targets wherein the data addresses comprise consecutive addresses that range from, for example, bit 0 to Mb 800 in 4 Kb segments, with an address pointing to each segment or block. In such embodiments, the data address space may be managed by ensuring that, depending on the storage objective, the number of contiguous available data addresses within the data address space is maximized (even though the data addresses may or may not point to storage locations which have any locational relationship at all). Other arrangements in such data address spaces include senquentializing consecutive data addresses in the same order as the data to which they have been associated in the translation layer; grouping a number of data addresses, which relate to two or more data objects, together contiguously when such data objects are likely to be (or have in the past been) temporally related, in that if requests are received relating to any one of the data objects in the group, data requests to the other data objects are likely to be received and so data associated with both data objects can be read concurrently or with reduced number of read requests; grouping in a contiguous manner, or in predetermined locations with the data address space, data addresses that are related to data that constitutes or is capable of determining metadata of a group of related data objects.

In some embodiments, the data address space is not necessarily a contiguous and/or consecutive group of addresses that appear to represent virtualized consecutive storage locations. The data address space can be sub-groups of data addresses which are not necessarily consecutive with one another even if the data addresses within each sub-group are consecutive. For example, in some embodiments a data address space may comprise a plurality of separate blocks or groupings of data addresses wherein each grouping may represent a specific storage target, such as an assigned physical or virtual data storage resource. In such a case, there may be a set of data addresses associated with a first resource or group of resources, and additional data addresses associated with additional resources (whether physical or virtualized); the data address space may comprise multiple sets of data addresses, wherein such sets of data addresses are non-contiguous and otherwise non-related with respect to each other.

In other cases, the data address space may comprise one or more data storage objects. In some storage devices, instead of presenting a data address space as consecutive data addresses, the storage devices may be configured to present storage objects as a data address space; in conjunction with such a device, the data address space of an embodiment of the instant disclosure would be the one or more data storage objects presented by the device that the device maps to the physical locations, or utilizes in conjunction with an additional layer of abstraction to map the data storage objects to data sub-addresses, such data sub-addresses being associable with physical storage location indicators. In such a case, the data consumer could over time, have a number of storage objects that comprises non-contiguous portions of the storage objects that are associated with related data (e.g. the data comes from the same data object, they come from related data objects, or they are related metadata, although other examples are possible in the same manner as described as for other data address spaces herein); in addition to being non-managed data address space (by being, for example, non-contiguous, or out of sequence, or duplicated metadata, or other examples of non-managed data address space) within a storage object, the portion of the data address space may be found across different storage objects within the data address space. Rather than forcing the data consumer to request all of the storage objects and then re-writing the data objects into storage objects more efficiently, some embodiments of the instant disclosure utilize a re-mapping command, which may in embodiments comprise a move or a copy command, provide for an interface that causes such storage object devices to re-arrange the data address space, include management of the storage objects. Such an embodiment may permit the system to write data relating to metadata into specific data addresses as part of certain or all types of interaction with data objects for which metadata will be required. As such, the metadata will be up-to-date and stored in association with easily identifiable data addresses; in other cases, the data required to calculate the necessary metadata may also be stored in association with easily identifiable data address. Some non-limited examples of assessed metadata may include, for illustrative purposes only, time of last access, identity of last user access, etc.

In some embodiments, the data address space may comprise a number of data storage objects, and may not include a direct mapping between data addresses accessible or visible to the data consumer, but rather the mapping of data from within a data storage object is handled by the data storage device; rather than sending data requests to a data address, a data consumer would send a get or put command, for example, to a data storage object ID. An examplary command may be as follows: get{data_object_ID, [the_data]}, where data_object_ID is the data object ID that allows the data storage device and the data consumer to agree on which data object in respect of which they are interacting and [the_data] is the data that is to be read (which in the case of a read, may be a null set), and alternatively, another command may be put{data_object_ID, [the_data]}, which would write [the_data] to a data object that can be identified as data_object_ID. The data address space includes the set of all data objects made available by the data storage device and could be considered a "per-object" data address space rather than a "per-address" data address space. In yet further embodiments, the data storage device may be an aggregation of other disks (or data storage devices), each of which having their own controller, translation layer, and storage medium components; in this example, the controllers on the subset of aggregated data storage devices (which makes up the data storage device) can communicate with one another. Over time, for example, one or more data storage objects can become sparse or fragmented, and the data address space management subject matter disclosed herein may be configured to manage the data address space associated with such data storage objects. If a number of data storage objects become sparse over time, it would be helpful to both the data consumer and the data storage device if the sparse data sets could be combined into a single data storage object and the management of that data address space were handled by the data storage device (which in this case, is a number of aggregated data storage devices, such as JBODs—"Just A Box of Disks"—or JBOKs—"Just A Bunch of Kinetics"). As a practical example, in some embodiments, a data consumer may wish to store a set of cold data to the set of JBODS (which, taken together, are referred to in this example as the data storage device and can be referred to as "sub-devices"), wherein such sets of cold data each comprise a plurality of unrelated pieces of data. Over time, as a number of these data objects containing cold data are accessed and changed, the data within a data object becomes sparse, but an entire data object must be called when reading any data therefrom. As such, there is provided herein a mechanism for re-arranging data from across a number of these data objects into a single or reduced number of data objects, thereby reducing the number of data requests associated with interacting with that data. In this example, there are multiple controllers, i.e. one on each sub-device, which can communicate with one another across the sub-devices to re-allocate, read from, or write to, the storage medium components of the other sub-devices. Other use cases may include examples wherein data that is temporally-related, with respect to when such data is read, written, or updated, is placed within the same data storage object; data that is associated with related metadata for a group of similar or related data objects is placed within the data storage object.

Figure 5:
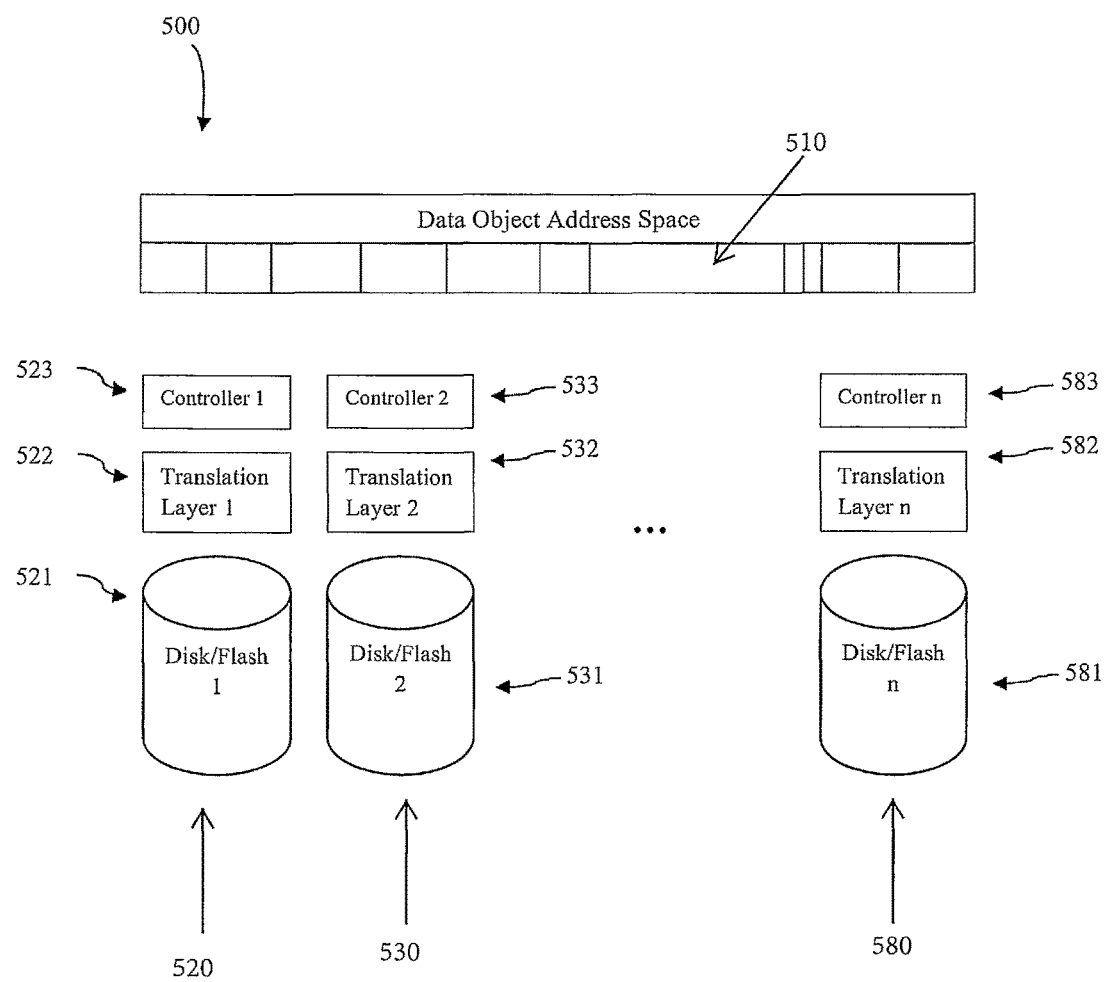
FIG. 5 is a representative diagram of another data address management system in use with a data consumer device in accordance with one embodiment of the instantly disclosed subject matter.

With reference to FIG. 5, there is provided an example of a data storage device 500 which presents a data address space as a set of data storage objects and comprises of a number of sub-devices 520, 530, 580. There is a common data address space, comprising of a data storage object translation layer for data storage objects 510, even though each sub-device may have its own translation layer 522, 532, 582 referring to its own storage medium component 521, 531, 581. Each sub-device also comprises its own controller 523, 533, 583, each of which may communicate with one another when amending associations between a first data in a first data object, to the same first data into a second data object, for example. In some embodiments, each sub-device may have a unique IP address, even though the data storage object address space spans the entire aggregation of the sub-devices. In the example shown in FIG. 5, the aggregated sub-devices is a JBOD (i.e. the data storage device is a JBOD, comprising a number of disks for storage 520, 530, 580). The use of other types of storage sub-devices, such as flash cards, or other technologies, can be used in place of disks without departing from the scope and spirit of the disclosed subject matter.

There are embodiments wherein the arrangement by the disclosed subject matter of data addresses within a data address space are not necessarily made adjacent, non-contiguous sequential, or non-adjacent; other efficient arrangement of data addresses are possible. The arrangement of the data addresses within the data address space will in general be carried out to minimize the interaction with the data storage device. In some embodiments, certain types of metadata relating to related data objects may be stored in either pre-determined locations, or in locations that are specified according to a pre-determined heuristic or methodology. While it may be possible to store metadata, or data capable of being used to calculate or determine metadata for a group of related data objects in a contiguous manner, to minimize storage of such data as well as interactions required to send requests relating to such data, it is also possible to store such data at predictable or known storage locations. Such data may located at every $x^{th}$ data address, or at data addresses which are calculated according to a hash function, or other function. In one embodiment, data requests are configured to be accompanied by metadata that describes a characteristic of the data or the data request (e.g. requestor's identity or IP address, time of request, size of request, etc.) and then stored with a data address in the data address space that may be contiguous and/or sequential with all the accompanying metadata for similar requests (or requests for similar data types or data object types), but also at a pre-determined set of addresses that are determined according to a heuristic or function. In some cases, the hash function to determine the data address may require a key or other decoding information that is available from authorized users (or maintained by the system as long as power is maintained, so as to prevent theft or unauthorized removal of the device). While the above examples regarding non-adjacent data addresses were described with respect to the management of data addresses relating to stored metadata, non-adjacent data addresses that are arranged as described above may also be implemented for other data storage objectives, including those described elsewhere (e.g. to minimize read and write requests for logically, spatially, and temporally related data objects or the data from such data objects). Such examples of additional storage objectives may include security or data-integrity, since the use of a hash function to identify the locationally-related data addresses can utilize specialized information (e.g. a private key). Without the key, a data consumer would not be able to call all the locationally-related data since the pre-determined locations would not be determinable by such a data consumer.

There are disclosed herein systems and devices for organizing (including sequencing, defragmenting, temporally associating, and view-based arrangements) a data address space for a memory device, wherein the device address space comprises of addresses that correspond to physical location indicators, the physical location indicators corresponding with physical locations on a storage medium within the memory device. The communication may occur through an external bus.

Figure 2:
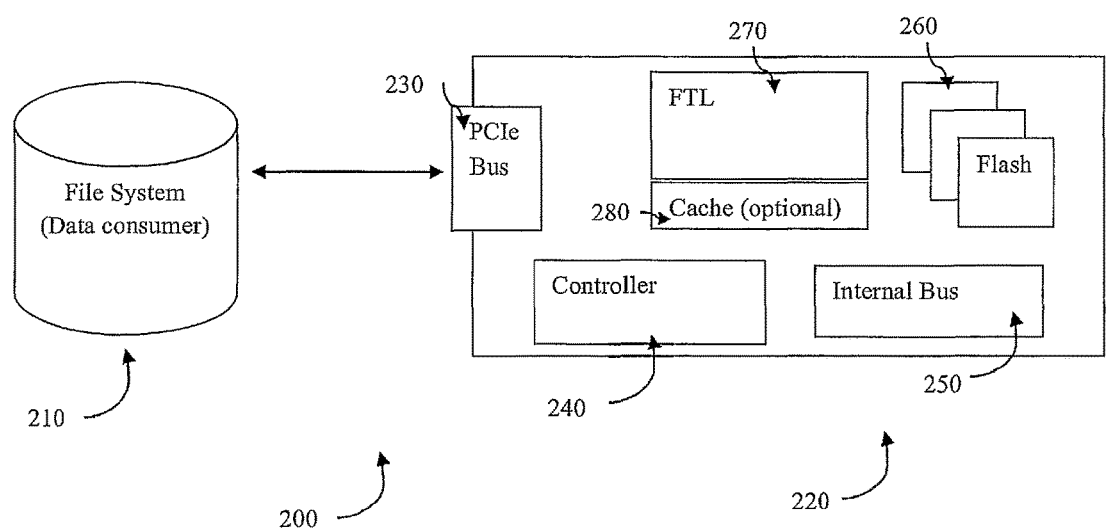
FIG. 2 is a representative diagram of a data address management system in use with a data consumer device in accordance with one embodiment of the instantly disclosed subject matter.

With reference to FIG. 2, an exemplary data storage device 220 is shown in an operating environment 200, in which bus 230 is a PCIe bus. The storage device 220, in addition to the PCIe bus 230 for linking with the data consumer 210 (which is a file system in this case), has a number of additional components. These include, but are not limited to, a controller 240, an internal bus 250, one or more storage medium components 260, a translation layer module 270, and in some cases, a cache memory 280. The controller 240 is a processor which processes and implements instructions relating to the operation of the storage device. The internal bus 250 is the internal communication system that links the storage media 260, the controller 240, the translation layer module 270, the cache 280 and the external bus 230; the internal bus 250, in some cases because it has a near-dedicated purpose and operation, is generally very fast and in some cases faster than the external bus 230. In addition to being dedicated, the internal bus 250 may in some cases have an operational benefit or requirement to be faster than the external bus 230 so that internal communication and signal processing does not impact the overall speed and latency of the storage device 220 itself. The internal bus 250 provides a communicative coupling between the components of the storage device 220; in some cases, the coupling is between and amongst each of the storage medium components 260, the translation layer component 270, and the cache memory device 280; it may also include a coupling between those components as a unit and the controller 240, or alternatively, each of the components individually with one another, or different combinations thereof with different components forming a unit. The storage medium components 260 is/are the physical medium upon which data is stored within the storage device 220; this may comprise volatile and non-volatile computer storage, such as DRAM, SRAM, SDRAM, as non-limiting examples of volatile memory, and ROM, PROM, EPROM, EEPROM, flash (including NOR, NAND, SONOS, phase-change RAM, MRAM), or other examples of non-volatile memory known to persons skilled in the art of this disclosure. There may be one or a plurality of discreet storage medium components 260; a single device may be scalably built with more or less storage capacity that meets the needs of the data consumer. The optional cache 280 provides a cache memory for operations that occur within the device, such as may occur when data is moved or copied to another cell or location on the physical memory. Such cache memory may include RAM, such as SRAM, DRAM, SDRAM, and is in many cases high-speed and expensive (relative to the speed and cost of the storage medium components). The cache memory may be volatile memory, embodiments with non-volatile cache are possible.

The translation layer constitutes a mapping between logical addresses, used by the data consumer to identify and locate specific data, and physical addresses, that are associated with specific physical locations on the storage medium components. In some embodiments, the translation layer constitutes, on the one hand, an address space of a finite (but in some cases variable) number of data addresses, each of which is associated with a quantity of storage capacity; on the other hand, each data address is capable of being associated with a physical location indicator that is indicative of the specific storage location on the storage component. The translation layer may, in some embodiments, be embodied as a lookup table for associating logical data addresses with physical storage locations.

A bus may be considered as a communication system that transfers data between components inside a computer, or between computers; the use of the word bus in this context may be understood in some instances to cover all related hardware components (wire, optical fiber, etc.) and software, including communication protocols or other protocols. PCIe relates to the Peripheral Component Interconnect Express), officially abbreviated as PCIe, and is a high-speed serial computer expansion bus standard designed to replace the older PCI, PCI-X, and AGP bus standards. These or other bus standards may be used in various components and elements disclosed herein without departing from the scope and nature of this disclosure.

In one embodiment, the subject matter of the instant disclosure can be implemented to increase or maximize the amount of contiguous free address space. A consequence of the increased amount of available and contiguous address space for the storage resource (i.e. the flash device) is that the file system, which may be responsible for keeping track of where a data object is (or is to be stored) on the storage resource, can interact with the data of the data object with a single or reduced number of requests. If there is sufficient contiguous available data address space, the number of requests to, for example, write that associated data to the storage device is limited only by the maximum amount of data that can be associated with a data request, rather than the available contiguous address space. To the extent that the largest available contiguous data address space is less than such maximum request size, the data request must be split into a plurality of data requests to each of the associated data address allocations, which would increase the number of requests to be sent (including confirmations that are sent in response to such requests) and also the number of write operations onto the physical memory space.

In some embodiments, addresses in the address space that are allocated to data from a data object can be defragmented and/or sequentialized so that data requests relating to that data object, such as read requests, can be minimized. In other words, the data object can be read with a single data request; conversely, if the data is allocated across non-sequential or fragmented data addresses, multiple read requests must be made.

In some embodiments, addresses in the address space that are allocated for data being temporally correlated (or data that is associated with temporally correlated data objects) can be made sequential and/or grouped together in the address space. As such that temporally correlated data can, for example, be "pre-fetched" to a higher tier of data, or otherwise prepared for a future interaction with all the correlated data in a minimal number of interactions. Since the temporally correlated data has been made sequential or defragmented, the entire set of the correlated data objects can, for example, be retrieved in a minimal number of read requests; the amount of data returned from any read request is limited only by the maximum amount of data that can be carried within a response to such a request—rather than having to make requests for each discreet sequential portion of data, which, depending on the level of granularity of each such sequential portion of data, can require at least equal number of requests but much more likely significantly higher number of interactions. Temporally related data includes data that is likely to be interacted with by a data consumer at the same or close to the same time. Temporally related data may also include data that has similar levels of priority at similar times (i.e. data that is "cold" over the weekend may be grouped together in the data address space and data that is "hot" at 9 AM on a Monday morning). Such data may be grouped together in a data address space, making prefetching of all of the temporally related data occur with fewer interactions upon the receipt of data requests for any one data or portion of data associated with the set of temporally related data.

In some embodiments, the implementation of management of address space disclosed herein can provide for an efficient manner of using views of characteristics or properties of related data objects with minimal interactions. As would be known to a person skilled in the art of the instant disclosure, properties of related data objects can be accessed for reasons other than the utility provided by the data objects themselves. For example, a file system may require frequent access to all the header information of all image or video data files that are stored therein. Currently, systems must either call all the related data objects, that is all the image or video files, or store such data in a specific file elsewhere. The instant disclosure provides an implementation wherein the data associated with such metadata may be associated with data addresses that are sequential and/or contiguous and/or locationally-related within the address space, therein providing for more efficient interaction with this data (i.e. with minimal read or write requests) and without having to duplicate the data in additional data objects (which can become inconsistent with the true metadata) or having to retrieve all the data associated with the data objects.

Address space management in existing systems typically involves the data consumer calling the data, storing the data locally, then writing the data to different addresses within the namespace. The instant disclosure utilizes the dedicated storage device processors/buses to re-allocate the data to different physical data locations and thereby manage the data address space for interaction with the data consumer, with reduced intervention from the data consumer.

As an example of the internal flash device infrastructure being utilized to organize the available address space the FTL comprises of a mapping of logical addresses to physical storage locations in the flash. The physical storage spaces (referred to below as blocks) are locations in the storage medium comprising of physical locations that must be erased prior to being written; the medium further comprises of "erase blocks" which consists of multiple blocks that can only be erased concurrently. In examples herein, each row constitutes a discreet erase block.

In embodiments of the instantly disclosed subject matter, there are provided methods of organizing the data address space of a data storage device. In one embodiment, there is provided a method for manipulating a data address space of a data storage device, the data storage device comprising at least one controller and at least one storage medium component, the data address space comprising a plurality of data addresses, each data address being associable with at least one storage location indicator that is indicative of a storage location in the at least one storage medium component, the method comprising: selecting a first data address in the data address space associated with a first data via a first storage location indicator, wherein the first data lacks a pre-determined storage-related characteristic with data associated with at least one data address that is locationally-related to the first data address; selecting a second data address from the data address space, the second data address being available for addressing data and being locationally-related to at least one data address that is associated with a second data that shares the pre-determined storage characteristic with the first data; and generating an association between the second data address and the storage location indicator indicating the current storage location of the first data. In such an embodiment, a first data address which is currently included in the data address space in an arbitrary, or otherwise inefficient, portion thereof, is identified for reallocation. For example, if the first data address is fragmented (or otherwise separated from other in-use data addresses), available for addressing data, out of sequence with other data addresses that are related to the data to which the first data address is currently addressing, or otherwise does not share a storage-related characteristic with adjacent or other data addresses that have are locationally-related (e.g. by being adjacent or being located at one of a predetermined data address locations or the data address is identifiable according to a pre-determined function, methodology or heuristic), then the data address may be selected for management. The second data address is selected on the basis that: (1) it is or will be available for addressing the data currently associated with the first data address via the storage location indicator; and (2) it is or is capable of being locationally-related to another data address that shares a storage characteristic with the first data address. The storage characteristic may include whether the data address is currently addressing: live data (defragmenting occupied data addresses) or non-live data (defragmenting available data addresses). The storage characteristics may also indicate two discrete pieces of data that are from the same data object, temporally related data objects, sequential in a data object or a data stream, part of the same metadata or class of metadata for similar data objects or data objects that are part of the same class of data objects; such selection of the management of the data addresses for one or both of the addresses associated with these pieces of data may occur under the methods described herein for the operational objectives discussed above (i.e. defragmenting, sequentializing, or otherwise rendering locationally-related). Upon selecting first and second data addresses, a storage location indicator that is indicative of the current storage location is associated with the second data address; the updated storage location is either the same location as was associated with the first address (in the case of a move wherein the physical storage location indicator associated with another data address is changed to be associated with the same storage location as the first data address is currently and, in some embodiments, the first data address is freed up or otherwise made available by deleting the association or tracking the availability elsewhere in the data storage device and optionally notifying the data consumer of the change in data address for that data), or it may be a new storage location indicator if the data was copied and moved to a new storage location (optionally the data consumer is concurrently notified that the data address for that data has changed).

In some embodiments, the first data address is disassociated with the storage location indicator with which it was associated. This may be done by deleting the association or by keeping track of which data addresses are not associated with live data in another lookup table in the data storage device. In some embodiments, the first data address need not be disassociated as it may be possible and/or desirable for both the first and second data addresses to point to the same storage location.

Locationally-related data addresses may, in some embodiments, include adjacent data addresses. However, non-adjacent data addresses may be locationally-related in some embodiments by, for example, designating specific data addresses (which may or may not be adjacent) for certain data or types of data. In such cases, the designated data addresses may be according to a heuristic or regular pattern (e.g. every $x^{th}$ data address is for metadata for a given type of data object), or made available in a lookup table. In other cases, the data addresses are locationally-related because they are all identifiable according to a pre-determined function or methodology, such as a hash function. This can provide both ease of identification of the locationally-related data addresses but can also provide additional functionality, such as security, encryption, data verification, etc.

Figure 3:
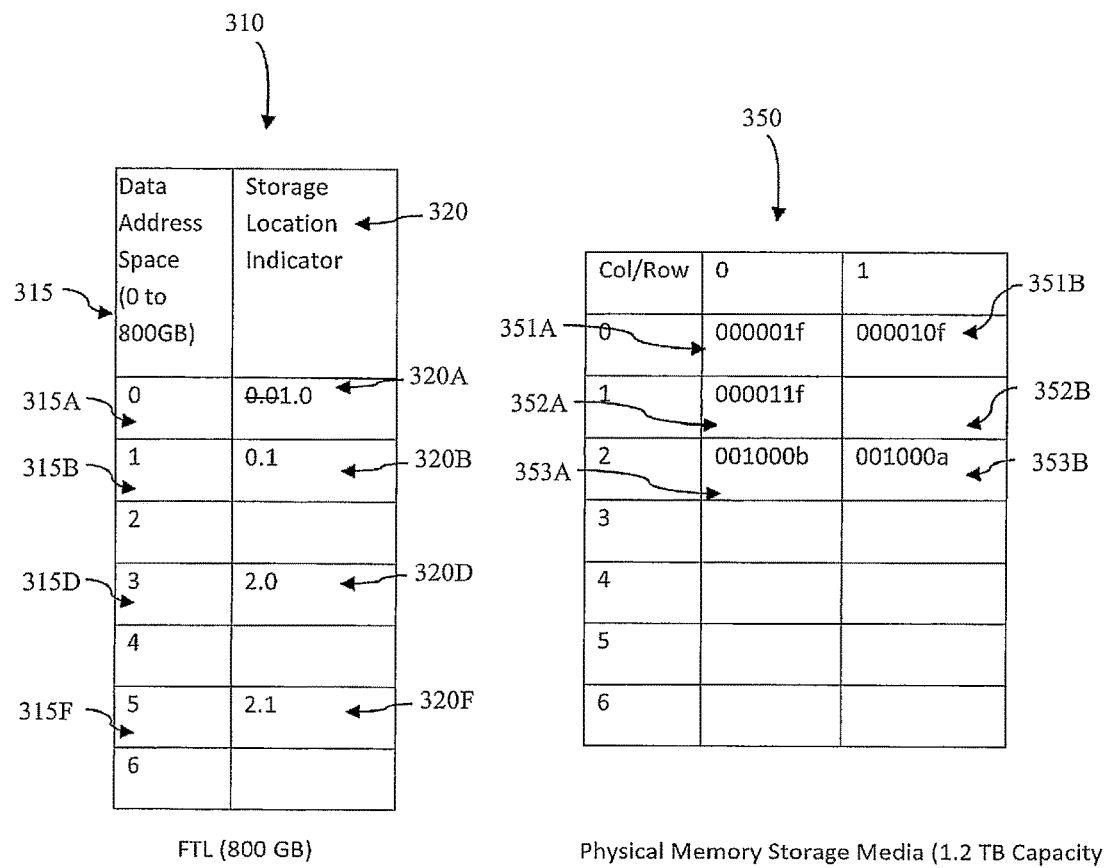
FIG. 3 is an exemplary and illustrative representation of a translation layer and physical storage medium in accordance with one embodiment of the instantly disclosed subject matter.

With reference to FIG. 3, an example will now be described, in accordance with one embodiment, wherein a series of operations involving data requests to a memory device are carried out on a translation layer module, in this case an FTL 310 that allocates 800 Gb worth of data, and a physical memory storage medium 350 that constitutes storage capacity for 1.2 Tb of data.

Step 1: "000001f" is to be written to the storage device, and the file system sends a write request to data address "0", which is currently available in the data address space in the FTL 310; the controller directs the write data to block 0.0 351A (which according to this exemplary convention is row "0" and column "0", or "R.C") on the physical memory storage medium 350 and updates the data address space 315 in the FTL 310 such that the data address "0" 315A for this data is now associated with the block "0.0".

Step 2: Next, "00010f" is to be written, so the file system sends the write request to data address "1" 315B, which is also currently available in the address space; the controller directs the write data to block 0.1 (i.e. row "0" and column "1") 351B and updates the FTL 310 by associating data address "1" 315B with "0.1" (i.e. the physical location indicator for row "0" and column "1").

Step 3: A request from the file system for the data stored at data address "0" 315A (which is currently mapped to "0.0" 351A) is received to update that data and replace it with "000011f"; since the data in block 0.1 351B must be preserved, but block 0.0 351A cannot be written to until it has been erased—and only an entire erase block can be erased, which is in this example an entire row 351—the updated data is instead written to block 1.0 352A (that is, row "1", column "0") and the FTL 310 is updated to associate the data address "0" 315A with "1.0" 320A and the block 0.0 351A is identified as being null or available (this may occur in the FTL 310 as part of the same mapping table, or there may be a separate component within the storage device to keep track of data that is null, or otherwise no longer needed, but not yet erased within the physical storage medium 350). As an aside, over time the number of rows (i.e. erase blocks) having at least one block with live data and at least one null data, will increase and as this approaches the maximum number of erase blocks, the controller will have to do some housekeeping by transferring live data from a number of different erase blocks into a single erase block and update the FTL 310, as well as keeping track of the erase blocks that no longer have any live data and either erasing them at that time or flagging them as available for erasing when data is to be written thereto.

Step 4: Next, "001000a" and "001000b", which are data relating to, and together constituting, a single data object, are sent as part of a write request to data addresses "5" 315D and "3" 315F respectively; the controller stores these data at 2.1 353A and 2.0 353B respectively and then updates the FTL 310 to associate "5" 315D with physical location indicator 2.0 and "3" 315F with physical location indicator 2.1. Notably, these data are neither contiguous nor sequential (in the sense that data from the beginning of the data object has a higher data address, which may be important if data must be returned in a particular order) in the data address space.

At this point in time, the address space comprises of non-contiguous available addresses and addresses that are non-sequentially ordered relative to the order of the data in the stored data objects. In addition, the relationship between contiguous addresses (or indeed any two or more addresses) is completely arbitrary. Subject matter disclosed herein provides for an efficient manner of re-arranging the data address space that is used by data consumers using the constructs available in the data storage device for such management, which reduces the overhead on the data consumer. As such, the data storage device may cause data address "2" 315C to be associated with 2.0 (in the case of a move; in the case of a copy, it may copy the data to another cell in the physical memory storage medium 350 and cause the data "2" 315C to be associated with that new cell) and then notify the data consumer of the new address. The same process would occur for data address "5", whereby data address "3" 325D would be associated with the data that was originally associated with "5" via the same storage location indicator (in the case of a move) or another storage location indicator (in the case of copy). As a result, the largest contiguous block of address space goes from 1 data address (each of 315C, 315E and 315G) to 3 data addresses (315E to 315G inclusive).

In embodiments of the instantly disclosed subject matter, there are disclosed methods for organizing the address space of a translation layer component. In some embodiments, the organizing of address space involves changing the associations between logical addresses in the address space of the translation layer and the physical location indicators in the translation layer. This can be accomplished in any of a variety of ways including by assigning the physical location indicator associated with a first address to a second address in the address space, and then freeing the first address for further use. Optionally, the updated address for the data that is stored at the physical storage location is communicated to the data consumer (which may be, for example, a file system) so that future interaction with that data is sent to the appropriate address; this updating communication may happen at the time of reassignment, or when a data interaction with that data occurs, or by a bulk communication of all the data address reassignments that have occurred during a previous time interval, or when the data consumer next requests data from the prior data address, or a combination of any or all of these. In other embodiments, the data is copied from a first data location to a second data location, and a second data address is amended so that it is associated with the second data location. In each case, changes to the data address space of the translation layer are effected. In some embodiments, the changes to the data addresses within the data address space are implemented according to a "move" function, a "copy" function, or a "remap" function.

The "move" function or functionality for rearranging data addresses with the data address space operates as follows. For a given first set of arbitrary and unrelated data addresses in a data address space, which are assigned in the translation layer module to data that is from the same data object (or is otherwise related), a new group of data addresses in the translation layer module that are locationally-related are assigned the storage location indicators that currently apply to the first set of unrelated data addresses. The first set are then either released (although they may be maintained with the same physical storage location indicators for security or redundancy) and the data consumer is updated with respect to the new addresses that should now be used to send requests for the same data. It should be noted that there are other unrelated processes that may relate to the data address, such as encryption, data verification or other processes that use, for example, a hash function and/or encryption key along with the specific current data address to carry out such processes; in such cases, the data device will update such processes (e.g. update the hash function information between the data storage device and/or data consumer) so that the change in the address by simply moving the physical location indicator does not result in errors when interacting with data.

The "copy" function or functionality for rearranging data addresses copies the data in one storage location and moves the copy to another storage location and then uses an available data address in the data address space to which the physical location indicator indicating the location of the new storage location is assigned. While the copy function utilizes some processing power within the data storage device, it minimizes the complexity relating to other peripheral processes (e.g. encryption, verification, etc. that may impact the move functionality as described above). The new data address (or data addresses) are updated with the data consumer via a notification, at the time of copying or at a later time (e.g. a bulk notification of a number of copies or the notification is provided upon the next data request for the data at the old address). The original or old address may be freed up, made available, have its physical location indicator deleted for future use within the data address space. Alternatively, both copies may be maintained for a number of reasons, including but not limited to redundancy, security, failsafe, or other reasons that would be known to persons skilled in the art. The copy functionality may, in embodiments, leverage the speed and dedicated functionality of the internal bus, over-provisioned memory, and existing protocols to manipulate the data address space, rather than the data consumer requesting the data from the data addresses that it wishes to rearrange and then rewriting such data to the available data addresses within the data address space.

The "remap" function or functionality comprises both or either of the move or copy functionalities. In some cases of this function, whether the data storage device utilizes the move or copy functionality is not visible or relevant to the data consumer and as such the remap function permits the data consumer to initiate data address space management but how that rearrangement is performed is left to the data storage device in any way it sees fit. The remap functionality may be implicit, including in cases where the data storage device presents a data address space in the form of data storage objects (e.g. OSD or object storage devices, Seagate™'s Kinetic™ storage device, JBOKs, etc.). In the latter example, when a number of storage objects have become sparse, unordered, or otherwise would benefit from a rearrangement of the data address space, the data storage device may be configured to recognize the conditions associated with the specific data consumer and its data for initiating data address space management. In the case of data storage objects, a number of sparse data objects may be combined into a reduced number, possibly with the data contained within such objects arranged into a particular configuration that permits interaction with such object with minimized interaction (e.g. a reduced number of data requests, such as read or write requests). In some cases, the data storage device may initiate a remap upon the occurrence of one or more pre-defined conditions; as an example, in one embodiment the data storage device self-initiates a remap when the largest contiguous block of data addresses reaches a predetermined threshold and continues until it reaches another predetermined threshold.

In some embodiments, there is provided an interface for managing a data address space, including by manipulating or rearranging the data addresses within the data address space. The interface may be an application programming interface ("API") that comprises a specification or prescription for interaction between the data consumer and the data storage device. The API may provide for "move", "copy" or "remap" functions to permit the data consumer to initiate data address space management upon command. Alternatively, the API may permit the data consumer to provide the data storage device sufficient information to enable such data storage device to initiate data address space management on its own when certain conditions are determined to exist (e.g. sparseness or non-contiguousness of data addresses reaches a pre-determined threshold). If a data address space characteristic reaches a pre-determined threshold, the data storage device may initiate data address space management on its own. In some cases, the interface may comprise of a set of computer readable instructions on a medium that, when carried out by a computer processor, provide for the interfaces between data consumer and data storage devices to manage a data address space.

In one embodiment, there is provided a data storage device interface between a data consumer and a data storage device, the data storage device comprising (i) at least one storage medium component with storage locations and (ii) a data address space comprising a plurality of data addresses, the data storage device interface comprising: a functionality command for providing a data address reallocation mode for manipulating data addresses in the data address space; a source data address identifier that identifies a first data address for reallocation, the first data address in use for addressing a data and being associated with one storage location indicator indicative of the storage location storing the data; and a destination data address identifier that identifies a second data address, the second data address being available for addressing the data; wherein the functionality command instructs the data storage device to allocate the storage location indicator indicating the current storage location of the data. In such an embodiment, the data storage device interface is an API or alternatively a computer readable medium having instructions corresponding to the API stored thereon. The functionality command may, in some embodiments, correspond to the move, copy or remap functionalities described herein, although other functionalities for causing the data storage device to manipulate the data address space may be used. Also in such an embodiment, the API may cause allocation of the storage location indicator of the data, currently in association with the first data address, to the second data address. Also within the scope of this embodiment, the API may cause the data stored at the storage location currently associated with the first data address to be copied to another storage location and then associate the storage location indicator, which indicates the location of that second storage location, to the second data address. Further, the functionality command may utilize a remap functionality, corresponding to the remap functionality described above.

In some embodiments, there are provided data storage devices with a plurality of controllers, each of which may communicate with one another, and each of which may have dedicated data storage resources and/or translation layer modules. The data consumer interacting with such data storage devices may be presented with a data address space that accesses or uses physical storage resources across all such controllers; in some of these cases, the controllers themselves may be responsible for assigning which controller is responsible for which portion or aspect of the data address space. In some such cases, the data consumer would have no visibility or transparency to which controller utilizes which portion of the data address space. For example, in the case of a data storage device that utilizes data storage objects, the interface may simply provide access to data storage objects, each of which exist on storage that is controlled by different controllers; the rearrangement of such data address space by, for example, placing the sparse data sets across multiple data storage objects into a reduced number of data storage objects, may in some cases necessarily require that controllers within the data storage device cooperate to remap data from a data storage object that is part of the data address space assigned to one set of data resources to another set that is assigned to a different controller; all of this may not be visible to, or require participation from the data consumer (except in some embodiments that request information regarding the conditions upon which initiation of the data address space management by the data storage device would occur).

In embodiments, the changes to the data address space of the translation layer may be coordinated to result in one or more outcomes that impact operational characteristics relating to improved efficiency of the data interaction and use by the data consumer, or for the storage device itself, or both. These outcomes include defragmentation of the contiguous available or unavailable data addresses, sequentializing data addresses such that the order of the data addresses for specific data matches the order of that data in the data object of which the data is a constituent part, grouping data addresses together that are used for data that is frequently accessed or is likely to be accessed at the same time or otherwise have a temporal relationship, grouping data addresses that are used for metadata or other data that may relate to the state or other characteristics of multiple data objects is accessed. The latter may occur when a view of a specific subset of metadata relating to all data belonging to a class of data; as a non-limiting example, a file system may wish to assess characteristics of all stored files of a particular type, such as determining how many media files with a specific extension exist in storage and/or how many or which of them have been read or altered in a previous time interval. Prior to such data being accessed, or if such data is access frequently, embodiments of the instantly disclosed subject matter can group together the data addresses (and optionally in a sequence related to the sequence of the underlying data, if the order of such data is associated with the use of that data by the data consumer) so that such metadata need not be copied to a separate location, and a minimized number of requests (either reads or writes) relating to such data is needed to interact with that data. Indeed, by facilitating (i) sufficient contiguous available data address space, interaction with the data storage device is minimized for writing data to the data storage device; and/or (ii) by sequentializing data addresses in accordance with some relationship between the underlying stored data (that is being addressed), the interactions for reading such data is minimized and/or (iii) by placing the metadata, or metadata-related data in identifiable or predetermined locations. The requests are not impacted by, for example, the size of the available address space or the size of the chunks of the data objects; the limiting factor shifts towards the maximum size of the amount of data that can relate to a given data request.

In embodiments that comprise spinning disks as the storage medium component, there are generally one or more magnetic spinning disks with an armature apparatus positioned and moveable so that the head of the armature can apply a magnetic field to the disk, thereby changing the state of the disk at that location. The disks are generally spinning so that tracks of sequential memory locations are located in concentric rings around each spinning disk. Data may be stored anywhere on the respective spinning disks, so seek time to get to read or write data on a disk is a function of how many tracks are associated with the data and how far the armature needs to move between tracks. Because of this sequential reads/writes on a single track are generally faster (e.g. 100 MB/s) than random reads/writes (e.g. 2 MB/s). A translation layer may be used to provide data addresses for data stored on the disks to keep track of which tracks are used for storing that data, and where amongst said tracks the data is specifically stored. Using a translation layer to maintain related data, for example, on the same or adjacent tracks may be facilitated by the use of having a data address space to track physical locations within a spinning disk medium.

There are a number of functionalities that are coded in the storage device, generally firmware controllers with various protocols (e.g. SAS or Serial Attached SCSi, SATA or Serial ATA). These controllers may comprise of a CPU, a memory and a high-speed communications bus; alternatively, the controllers may operate in conjunction with memory and a bus located elsewhere in the data storage device. The protocols consist of a number of commands, and may include seek, read, write, move, or copy. Many storage devices have a communications bus with file systems, or other application level entities, that is around 600 MB/s. This is because, even with multiple spinning disks within a given storage device, or even groups of storage devices that work concurrently in presenting a single virtual storage unit, the physical limitations of the layout of the data on spinning disks will in general never exceed this upper limit of communication speed.

In contrast, flash memory does not have similar problems relating to the physical layout of the data. Flash does, however, sometimes suffer from analogous logical issues. In many flash memory systems, the storage media is different from spinning disks in that storage locations must be erased before they are written upon. That is, you can read from a flash storage location, you can write to it (by setting a 1 to a 0) or you can erase it (by setting a 0 to a 1). In many cases, flash memory is not erased at the same level as it is written. That is to say that while individual flash memory units can be written upon, erasing generally occurs to groups of memory units; so in order to write something new on a group of flash memory units (such as memory cells), the entire erase group must be erased before doing so. In cases where some data in the erase group must be maintained, the entire group must be moved or copied elsewhere. In order to manage this problem, flash memory devices have used "Flash Translation Layers", or FTL, which operates as a mapping of physical address spaces on the flash media. If a group data needs to be erased in order to write something new, the existing data that must be maintained is copied elsewhere and the FTL maintains a mapping of where that moved data has been moved to. When all erase groups have at least one cell of live data, the system must re-arrange the data by putting live data into existing erase blocks. The flash memory device, during these times, has significantly reduced performance (throughput goes down, and latency goes up). This leads to periodic but short-lived time periods of significant reduction in performance. Flash memory devices have mitigated this problem by over-providing a significant excess of storage and processing capabilities to avoid this hampering performance. In some products, for example, an 800 GB flash card actually comprises 1.2 TB of storage. In other products, the over-provisioned storage is made selectively available for storage, thereby reducing performance, in other products the additional storage capacity is used exclusively for managing the block-erase problem. This has led to commercial flash memory devices being manufactured and distributed with an excess amount of storage media (e.g. multiple NAND flash devices) with a separate high-speed FTL media, a dedicated controller, and high-speed and dedicated internal bus for communication therebetween. In fact, the internal bus is generally much faster than the external PCIe or SAS buses (generally, 32 GB/s and 600 MB/s, respectively). This dedicated and high speed sub-set of functionality of flash memory devices can avoid the "re-arrangement" problem and provide uninterrupted performance levels of 200000 b/s of sequential reads, 80000 b/s of random reads and 50000 b/s of random writes. Many different types of commodity memory storage devices have internal mechanisms to map device address spaces to physical locations on a storage medium, including but not limited to flash memory devices and spinning disk devices.

Flash memory devices have FTL tables and additional storage to handle this problem. The FTL tables consist of a mapping of device address space that maps to a device physical address space. The reason for this is that when a cell in flash needs to be written to, an entire block must be deleted, which is not possible if there are other cells in that block that contain live data. In order to overcome this, the FTL utilizes its address space for mapping the data to the each physical cell and then changes that to a cell in a free erase block;

Step 1: write("hi",0)->"hi" written to cell (0,0), which is associated with "0" in the FTL Step 2: write("foo",1)->"foo" written to cell (0,1), which is associated with "1" in the FTL Step 3: write("bye",0)->"0" cannot be written without erasing both (0,0) and (0,1) because they are in the same erase block, so "0" is associated in the FTL with (1,0), and (0,0) becomes unassociated with any data and can be deleted later (there may be a separate mechanism within data storage systems to account for and keep track of whether cells are associated with "live" data that is current and not an older version that exists as part of an erase block which could not be erased and for which an newer version exists elsewhere as mapped by the FTL).

Over time, the address space becomes fragmented, or randomly, or arbitrarily ordered, which forces a file system that is associating data objects with data addresses in memory to place them, or read from them, for example, in ways that are not optimal for memory performance. For example, to write a data object to storage wherein the data address space is fragmented into portions such that there are not enough sequential or contiguous data addresses for all the data of the data object, separate write requests to each applicable available data address must be transacted. In cases where there is a single or small number of contiguous and available data addresses available for all of the data of the data object, then minimal number of write requests are required to write data to storage.

Currently, the sub-optimal placement of data within an address space may require that the file system (or other applicable data consumer) (1) read the data associated a data address that it wishes to reallocate by transmitting and receiving a response from a read request, (2) store that data in cache (or other local memory), and then (3) transmit and receive a response from a write request to data storage device with the desired address space. This requires the use of the PCIe bus, or external bus, which may be in general slower than the internal bus. Moreover, it consumes file system processing time, network bandwidth, and increases latency. Lastly, in current systems, unless the file system implements these actions proactively, the data will be stored in sub-optimal locations resulting in an increase in data operations in reading and writing on the data storage device. This disclosure describes a storage-related interface comprising a translation layer, associating logical data addresses and device address space mappings (or physical storage location indicators), combined with control elements that organizes data placement, to optimize data address allocation to minimize the number of operations required to interact with that data.

In one embodiment, data from a data object, e.g. a file, are associated in one or more portions with respective data addresses. Since there are limited data addresses available, the data portions must be associated with the available addresses in the address space; in the case of a write, if the available data addresses would not accommodate the entire data object, because for example large portions of the data address space comprise non-contiguous data addresses, then significantly more write requests must be made to write the portions into the multiple available spaces; if, on the other hand, the FTL/flash controller is configured to move/copy/organize data within the FTL/physical addresses without additional data transactions by the file system, the available address space can be organized to ensure that the data addresses therein can be organized to increase their effectiveness, by for example, increasing the contiguousness of the available address space by defragmenting the address space.

EXAMPLE

Figure 4:
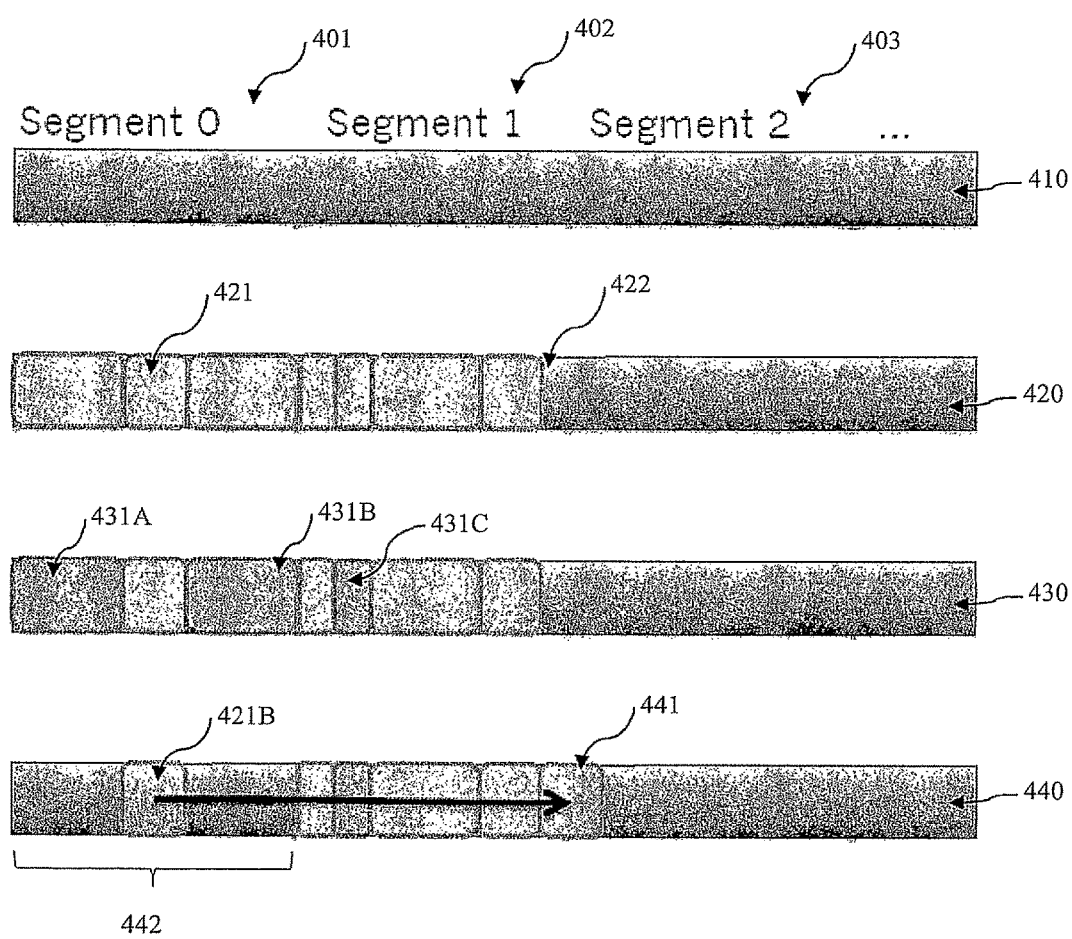
FIG. 4 is an exemplary representation of a single data address space at different stages of use.

With reference to to FIG. 4, the same data address space is provided at 4 different points in time 410, 420, 430, 440, the data address space log having a plurality of segments, the first three of which shown as 401, 402, 403. The data address space supports the following system: an enterprise storage system comprising multiple data storage devices based on PCIe Flash, in this case Intel 910s as a base. The enterprise storage device comprises a high-performance, high-scale product, which unlike single-box filers, integrates with SDN 10 GB switches to provide linear scale and capacity. The system has been validated against a pool of 20 Intel 910s, served over 20 10 GB ports to a replicated, fully-random, 80/20 fully replicated 4K NFS performance of almost 2M IOPs. The NFS file system constitutes the data consumer in this example. This enterprise product comprises a deep software stack, spanning flash, OS, network protocol design, switch chipset integration, which may be focused on performance and scale for large enterprise storage environments. The individual storage nodes receive read and write requests from many clients at once; the goal is to minimize IOPs and maximize performance.

In FIG. 4, the data address space at $t_0$ 410 shows the data address space prior to use. When the data address space is at $t_1$ 420, the request stream may use a log-structured on-disk layout where merges and appends are written in large, aligned blocks 421 at the data address space tail 422; data address space entries are self-describing, with no dependent metadata updates. In-memory mapping state allows reads to be served directly from the data address space.

At $t_2$, the data address space 430 has become fragmented: data has been overwritten and files are deleted, resulting in "dead data" spaces 431A, 431B, and 431C. Contiguous chunks of logical block addresses ("LBA") in the data address space would be preferable for the data address space, in order to avoid breaking up data requests to accommodate data storage for data objects that are larger than the largest available contiguous group of LBA. The LBA may be virtualized through an indirection table, but this would mean fragmenting data address space, and then appending requests and amplifying IOPs, as well as additional overhead by the NFS computing device. Prior solutions required that a segment based "garbage collector" that cleans from the head of the data address space, which cleans a region of multiple megabytes, as shown in the data address space after a third time interval 440. In so doing the NFS computing device reclaims dead data addresses, and moves live data 421B to the tail of the data address space 441, in order to free LBA regions 442, by sending data read requests, storing locally, and then sending data write requests to the free tail of the data address space 442. Moving data in this manner, however, is expensive.

In some alternative versions of this exemplary system, there is a hybrid log/heap, to allow for long-lived data and with independent treatment for cold and hot data to quickly reclaim data that is frequently overwritten. Even with these optimizations, under high write loads that have even small amounts of long-lived data, segment cleaning is the dominant overhead and leads to 60-70% performance fall-off, and R/W dependencies in coping from one part of the data address space to another add additional latencies. Given that the FTL of flash memory, comprising a flat indirection table, is already serving this role, implementation of the subject matter disclosed herein provides highly efficient management of the data address space, without the high overhead and cost of requiring the NFS computing device to manage the data address space as described above.

Below are two exemplary implementations of an aspect of the system described above. Since the NFS cannot ask for mappings from the lower layer (i.e. the physical addresses of R/W blocks within the flash media), there is provided an interface comprising the following commands:

move(src_lba, dst_lba, size) or
remap(src_lba, dst_lba, size)

This command moves or remaps data on flash from a source LBA (src_lba) to a destination LBA (dst_lba). Size is a multiple of flash block size, when addresses are block aligned. The call can fail if alignment or size is invalid. Remap may result in a move command, but can also result in a copy depending on settings. The commands in either case are implemented as an update to the flat indirection table (e.g. the flash translation layer in a flash device). While simple in implementation, some systems may result in some additional complexity using a "move" based command. In particular, from an FTL perspective, an accounting for what happens to data at the original mapping must be contemplated. Mapping the same data twice likely requires some sort of reference counting. Also, an alternate approach would replace the src_lba with a zero page. However, this raises concurrency issues in some stacks, with regard to in-flight reads, which may refer to src_lba.

In an alternative implementation, instead of moving location indicators between LBA, the following copy command leverages existing FTL functionalities:

soft_copy(src_lba, dst_lba, size)

This command may share some of the same characteristics as move( ) but the interface leaves valid copies of the data at both addresses. The FTL can implement either by remapping or by internally copying the data. This eases application development slightly, because there is no conflict with in-flight reads. In some embodiments, this command may implement the following: (a) generate a soft_copy of dst_lba, (b) update metadata, including at the NFS, and then (c) reclaim src_lba.

Figure 6:
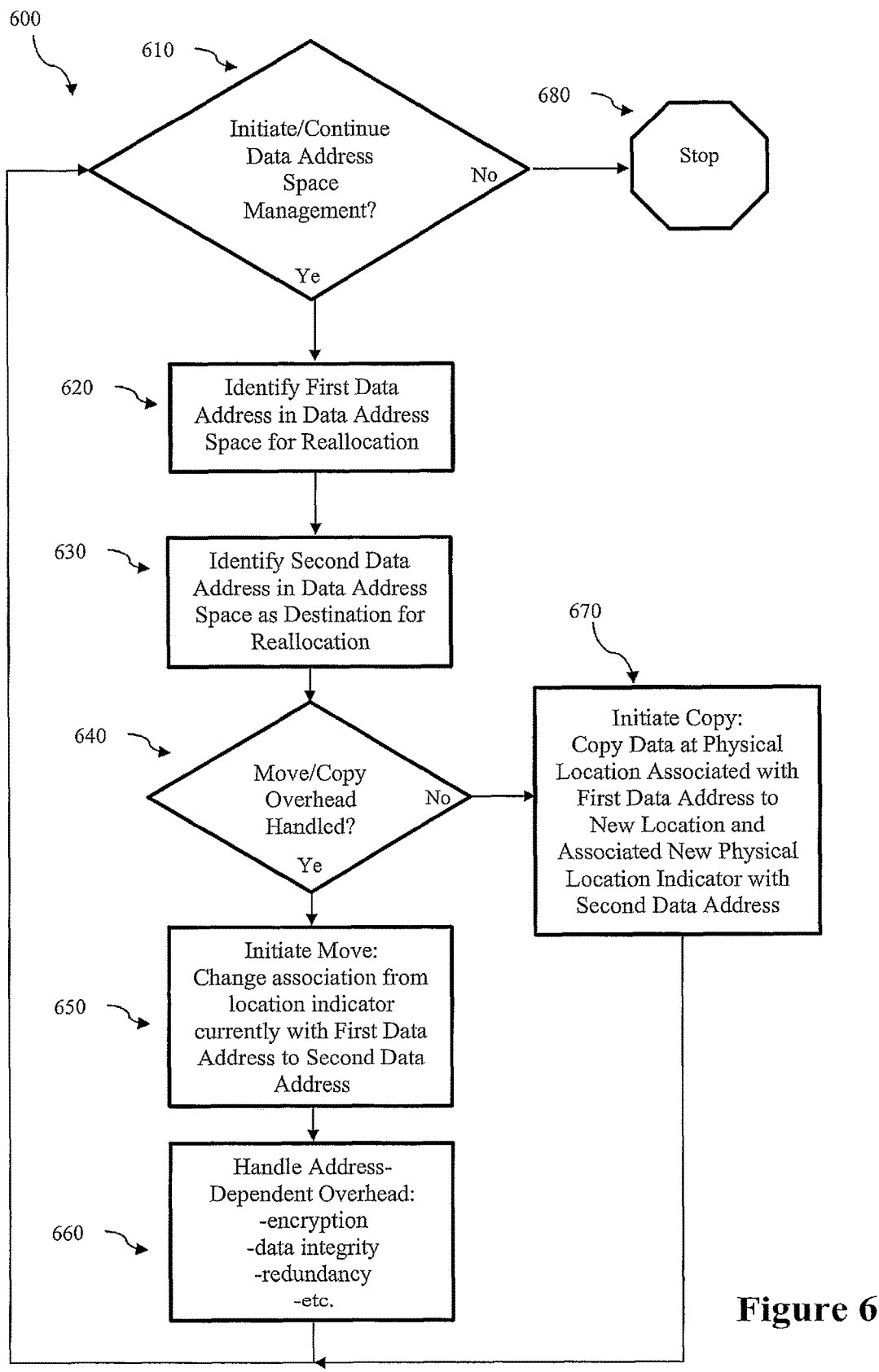
FIG. 6 is a block diagram representative of a method for managing a data address space in accordance with one embodiment of the subject matter disclosed herein.

Referring to FIG. 6, there is shown a flowchart that is representative of a method 600 in accordance with one embodiment of the instantly disclosed subject matter. Beginning at step 610, the controller of the data storage device initiates data address space management; the controller may receive a command from a data consumer, or other intermediary that has access to the data request path between the data consumer and the data storage device, wherein such commands may include copy, move, or remap, or another similar command that initiates reallocation of data addresses in the data address space. In some cases, the controller may not receive an explicit command for every reallocation of a given data address or set of data addresses, but rather detects certain characteristics that may be received independently from a data consumer (or other intermediary) or as part of the data in a data request transaction. If received as part of the data request transaction, such data may be a discrete portion of such data request or it may be identified and assessed by the controller (by, for example, analyzing the payload or the header information of a packet or other protocol data unit). Upon detecting the existence of certain characteristics, or that some criteria or threshold of such characteristics has been reached, the controller may initiate data address space management; else it may stop at this point 680. If data address space management is initiated, the controller, in step 620, seeks to identify a first data address that is currently being used by a data consumer to address data stored in the data storage media of the data storage device (and which is associated with a physical location therein by a physical location indicator in the translation layer). Such identification may be an explicit identification provided by the data consumer (or intermediary) in a move, copy or remap command, or the controller may have functionality stored thereon to identify data addresses that should or can be reallocated to achieve one or more operational objectives (e.g. grouping data addresses that are used for addressing related data) particularly when data address management occurs based on the automated detection of characteristics of the data, data requests, or data address space. It should be noted that in some cases, the data address may be allocated for data that is not yet stored in the data storage medium; for example, a data address, and a physical location by association in the translation layer, may both be associated with one another and allocated even if there is no data or live data currently stored at that physical location in the case of data write request that is or is potentially expected to be received. Similarly, at step 630, the controller identifies a second data address that is available for the data associated with the first data address; again, this may be explicitly presented as part of a command or other communication from the data consumer (or other intermediary), or it may be determined by the controller with or without additional information from the data consumer. At step 640, the controller determines whether a move or a copy is preferable; this may be an explicit requirement provided by the data consumer, and it may be necessary depending on other background requirements of the data storage device to the extent that there are any data address-dependent functionalities associated with the data storage. For example, there may be some encryption that utilizes information from the data address in a hash function or other encryption methodology that is utilized to encrypt and decrypt the data; in such cases, this overhead must be handled by amending the hash function or related information after the data address associated with that data has changed, including by updating the hash values or the associated keys to decrypt according to the source location and re-encrypting based on the new location. While this may include some additional overhead, including by passing the information through the encryption function (e.g. API), this can be located within the device-internal functionalities, while therefore avoiding the higher and/or different (e.g. networking vs. processing) overheads that are required under current systems to manage data address space and the underlying locations on the physical media.

Similarly, there may be support for other background functionalities that may have some data address dependent component, including but not limited to, storing back up or redundant copies (a determination of what is live or current data must be made or maintained elsewhere), ensuring data integrity (e.g. TCP data integrity checks during data request transactions), and any other data address dependent functionality. To the extent that such data address dependent functionality is present, and there is no overhead handling of such functionality upon the move of a data address, the controller must select to initiate a copy at step 670. If there is overhead handling, then the controller may select either a copy 670 or it may select a move at step 650, depending on resource requirements and availability. At step 660, the controller handles the address-dependent overhead. In some embodiments, particularly in (but not limited to) cases where the controller has initiated data address space management automatically upon detection of a characteristic or criteria thereof (e.g. reaching a threshold), this process may be iterative until such characteristic is no longer present or is within certain operational limits. If so, the process returns to step 610 where the controller assesses whether data address space management should continue or stop 680.

In some embodiments, the subject matter relates to the management of the data address space, as well as the associated physical data storage locations, in data storage resources using (i) characteristics between data in the physical storage locations and (ii) the device-internal translation layer management schemes implemented by modern storage devices, including but not limited to flash devices and other non-volatile data storage devices (e.g. PCiE devices), spinning disks, and CPU/RAM arrangements in general purpose computers.

In general, embodiments hereof facilitate: (1) the offloading of data transfer between physical locations on the data storage device to device-internal bus and transfer compute resources; and/or (2) allowing explicit manipulation of translation layer by off-device applications; and/or (3) the use of data-specific characteristics to more optimally manage either or both of the data address space and storage location without the associated overhead of sending and receiving data requests between data consumer and device.

Encryption: stored information is encrypted using the address as an argument to the encryption function; in order to move a data from location to another, or indeed re-mapped, it must first be passed through the encryption function to decrypt using the first address and then encrypted using the new address to ensure that it remains consistent.

For example, there may be encryption of data on flash or other devices that utilizes information from the data address in a hash function or other encryption methodology to encrypt and decrypt the data; in such cases, this overhead must be handled by amending the hash function or related information after the data address associated with that data has changed, including by updating the hash values or the associated keys to decrypt according to the source location and re-encrypting based on the new location. While this may include some additional overhead, including by passing the information through the encryption function (e.g. API) when moving or copying data as part of the data address space or location management methods, this can be carried out within the device-internal functionalities. This therefore still avoids the higher and/or additional (e.g. networking) overheads that are required under current systems to manage data address space and the underlying locations on the physical media.

In general, more and arbitrary processing can by pushed onto the device-internal bus and transfer compute resources. For example, transcoding, indexing, journaling of bulk operations, can be pushed down onto the device-internal bus and transfer compute resources.

By exposing control of the data address space, as well as the storage location management, to the data consumer, the data consumer can utilize information relating to the data (e.g. data characteristics or metadata) to determine optimal or more efficient placement of data within flash memory. For example, the data consumer is aware of or has access to information that characterizes data. This data is either unavailable to or unusable by the translation layer and/or the device-internal components when managing or placing data addresses and/or storage locations. By exposing the control that is available to the data consumer, however, more optimal data placement on the data storage medium and selection of the data addresses can be implemented. For example, the data consumer can be configured to ensure that data of similar priority is placed within the same erase blocks. As such, the efficiency and timing of erasing blocks can be improved. Erase blocks will not require reconciliation (e.g. garbage collection to free up stale or dead but unerased portions of the erase block) for a period of time at least as long as the first data unit to be updated; if cold and hot data can be arranged onto the same respective erase blocks, for example, "cold" erase blocks will likely not need to be reconciled frequently and only the "hot" erase blocks will require frequent reconciliation (unlike current systems where the relationship between data and the erase block is not manageable in this way and as such the likelihood of any given erase block requiring frequency is related to the likelihood of receiving more "hot" data, which is arbitrary and essentially the same across all erase blocks). For example, low priority data (i.e. cold) which are accessed and/or updated infrequently can be collocated on common erase blocks; such erase blocks will be much less likely to incrementally increase the number of stale blocks. Conversely, higher priority data (i.e. hot data) can be collocated on common erase blocks; such erase blocks will have a greater number of data units thereon become stale and the erase block can be garbage collected sooner in time with fewer live blocks having to be relocated and managed. This saves overall processing resources, reduces the number of times that flash memory has to be garbage collected, and may increase the lifetime overall of the flash memory device. As FTL implementations are generally unaware of data characteristics (or unable to manage data placement in accordance therewith in any event), an arbitrary mixing of high and low priority data within erase blocks will lead to inefficient data placement, wherein erase blocks have to be garbage collected and without regard to whether certain blocks thereon may be high priority and unlikely to change and whether a small number or a large number are likely to change frequently (and thus not being a good candidate for garbage collection). The data consumer may be configured to assess whether an erase block, given the priority of the data stored thereon, is a good candidate to move the data thereon as part of garbage collection, or if the erase block will, given more time, become more stale in an upcoming time interval, at which time the garbage collection will only require moving a smaller number of data blocks from such erase block.

In some embodiments, there may be implemented "Transactional Memory" applications; such applications include API's to implement bulk or multi-write transactions directly by the device-internal bus and transfer compute resources, and avoid the requirements for application-based journaling or other ways of managing memory transactions. Transactional memory applications often involve the use of complex algorithms, as well as expensive processing overhead, to ensure that data transactions are ordered and in some cases journaled or indexed to ensure the integrity of transactions. For example, to avoid a loss of integrity of data which may occur if there is a component failure during a data transaction, many systems include certain failsafe precautionary measures. This might include, but is not limited to, ensuring that data is copied prior to deleting the source data when moving data; it may also include journaling all steps in data transactions so that the transactions can be recorded and re-implemented in case of system failure. Such transactional safeguards and overhead are often called "transactional memory." In accordance with embodiments hereof, the overhead of such transactional memory can be pushed down to the device-internal translation layers and components.

Similarly, more and arbitrary processing can be pushed down onto the device-internal bus and transfer compute resources. For example, transcoding, indexing, journaling of bulk operations, can be pushed down onto the device-internal bus and transfer compute resources. Where transcoding may be utilized, for example in the case of generating multiple versions of media for download and playback on differently configured devices and/or which may have access to different network resources, the device-internal transfer and compute resources may be used to provide a subset of the data corresponding to a differently transcoded version. As such, the data consumer need not re-create multiple versions, but rather simply request the same data with a different transcoding and permit the device-internal bus and transfer compute resources to return only the subset of data corresponding to the requested transcoding (e.g. for a video stream, only 2 frames per second or fewer pixels per frame). Similarly, indexing and journaling may be carried out by the device-internal components, translation layer and the data storage medium.

In some embodiment, there is provided data storage system for managing data storage from a data consumer, and related methods and devices, wherein the data storage system comprises: a storage medium defining a plurality of storage locations, each one of which having a unique storage location indicator associated therewith; a translation layer defining a data address space having a plurality of data addresses, each one of which being assignable to at least one said unique storage location indicator; a resident controller carrying out computer readable instructions for writing and reading data in said storage locations and managing data addresses assigned thereto in said translation layer, said resident controller being further operable to carry out storage location optimization instructions in reassigning at least some of said storage locations to optimize access and use of said storage medium via said data address space; and an external communication interface accessible to the data consumer to service data requests received therefrom to said storage medium via said data address space. Such embodiments, which provide for an ability to optimize storage locations instead of, or concurrently with, the data address space, expose functionality to the data consumer to, for example, designate portions of the storage locations for specific data, specific types of data, and/or data sharing one or more characteristics. The storage location optimization may be implemented by providing information to the data consumer relating to the storage location associated with a specific data address, and therefore only access by the data consumer to the data address space is required; in other embodiments, the resident controller may provide access or information to both the data address space and the storage locations. Subject matter described herein to move or copy data to modify applicable data addresses, can therefore, by implemented for the objective of modifying applicable storage locations.

While the present disclosure describes various exemplary embodiments, the disclosure is not so limited. To the contrary, the disclosure is intended to cover various modifications and equivalent arrangements included within the general scope of the present disclosure.

What is claimed is:

1. A data storage system for storing data from a data consumer, the data storage system comprising:
   a storage medium component comprising a plurality of physical storage locations, each of the storage locations having a unique storage location indicator associated therewith;
   a translation layer module defining a data address space defining a plurality of data addresses, each of the data addresses being associable with the at least one unique storage location indicator; and
   a controller configured to:
      carry out computer readable instructions for writing and reading data in the storage locations and mapping associations in the translation layer module between data addresses and the storage location indicators, wherein
   the controller is configured to identify a first data address that is currently being used by a data consumer to address data stored in the storage medium component, determine whether a move or a copy is preferable, and initiate a copy or a move depending on the determination of which of a copy or a move is preferable, and
   the system is further configured to:
      remap a given data set stored in the storage medium component from a plurality of non-contiguous data addresses to a contiguous set of data addresses via the controller by making copies of given data in the given data set respectively associated with the non-contiguous data addresses, writing the copies to distinct physical storage locations, and associating the contiguous set of data addresses in the translation layer module with respective storage location indicators related to the distinct physical storage locations, wherein the system is configured to remap when a largest contiguous block of the data addresses reaches a predetermined threshold and the remap continues until another predetermined threshold is met.

2. The system of claim 1, wherein the data set comprises sequentially related data.

3. The system of claim 1, wherein the contiguous set of data addresses comprise sequential addresses.

4. The system of claim 1, wherein the data set comprises unrelated data.

5. The system of claim 1, wherein the data set comprises data that is used sequentially.

6. The system of claim 1, wherein the given data set comprises data from a same data object.

7. The system of claim 6, wherein the data object comprises one or more data files, one or more data sets, or one or more databases.

8. The system of claim 1, wherein the system is further configured to:
communicate a notification to the data consumer to update data address information for data from the given data set that has been remapped upon at least one of: a remapping, a notification threshold being reached where a plurality of notifications of remappings are generated by the controller, or receipt of a request by the data consumer for data that has been remapped since a prior request.

9. A data storage system for storing data from a data consumer, the data storage system comprising:
a storage medium component comprising a plurality of physical storage locations, each of the storage locations having a unique storage location indicator associated therewith;
a translation layer module defining a data address space defining a plurality of data addresses, each of the data addresses being associable with the at least one unique storage location indicator; and
a controller configured to carry out computer readable instructions for writing and reading data in the storage locations and mapping associations in the translation layer module between data addresses and the storage location indicators, wherein
the controller is configured to identify a first data address that is currently being used by a data consumer to address data stored in the storage medium component, determine whether a move or a copy is preferable, and initiate a copy or a move depending on the determination of which of a copy or a move is preferable,
the controller remaps the data addresses by making a copy of given data associated with a first data address, writes the copy to a second storage location, and associates a second data address in the translation layer module with a given storage location indicator related to the second storage location, and
the system is further configured to remap, via the controller, a given data set that is associated with a plurality of data addresses having one or more non-contiguous sets of available data addresses separately interspersed therein to make a contiguous set of available data addresses corresponding in size to a sum of the sizes of at least some of the non-contiguous sets of available data addresses, wherein the system is configured to remap when a largest contiguous block of the data addresses reaches a predetermined threshold and the remap continues until another predetermined threshold is met.

10. The system of claim 9, wherein the system is further configured to:
communicate a notification to the data consumer to update data address information for data from the given data set that has been remapped upon at least one of: the remapping, a notification threshold being reached wherein a plurality of notifications of remappings are generated by the controller, or receipt of a request from the data consumer for data that has been remapped since a prior request.

11. A data storage system for storing data from a data consumer, the data storage system comprising:
a storage medium component comprising a plurality of physical storage locations, each of the storage locations having a unique storage location indicator associated therewith;
a translation layer module defining a data address space defining a plurality of data addresses, each of the data addresses being associable with the at least one unique storage location indicator; and
a controller configured to carry out computer readable instructions for writing and reading data in the storage locations and mapping associations in the translation layer module between data addresses and the storage location indicators, wherein
the controller is configured to identify a first data address that is currently being used by a data consumer to address data stored in the storage medium component, determine whether a move or a copy is preferable, and initiate a copy or a move depending on the determination of which of a copy or a move is preferable, and
the system is further configured to:
remap a given data set of related data stored in the storage medium component from a plurality of locationally-unrelated data addresses to locationally-related data addresses via the controller by making copies of the related data in the given data set respectively associated with the locationally-unrelated data addresses, writing the copies to locationally-related physical storage locations, and associating the locationally-related data addresses in the translation layer module with respective storage location indicators related to the locationally-related physical storage locations, wherein the system is configured to remap when a largest contiguous block of the data addresses reaches a predetermined threshold and the remap continues until another predetermined threshold is met.

12. The system of claim 11, wherein the locationally-related data addresses are contiguous.

13. The system of claim 11, wherein the locationally-related data addresses are sequential.

14. The system of claim 11, wherein the locationally-related data addresses are a repeating arrangement of addresses.

15. The system of claim 11, wherein the locationally-related data addresses are a predetermined set of specific addresses.

16. The system of claim 11, wherein the locationally-related data addresses are designated using a hash function.

17. The system of claim 11, wherein the related data forms part of a same data object.

18. The system of claim 11, wherein the related data shares a similar priority.

19. The system of claim 11, wherein the related data shares a same file type.

20. The system of claim 11, wherein the related data comprises metadata.

21. The system of claim 11, wherein the related data represents a specific portion of a same data object.

22. The system of claim 21, wherein the specific portion comprises a file header.

* * * * *